US012651426B2

(12) United States Patent
Cho

(10) Patent No.: US 12,651,426 B2
(45) Date of Patent: Jun. 9, 2026

(54) METHOD FOR GENERATING IMPROVED TRAINING DATA VIDEO AND APPARATUS THEREOF

(71) Applicant: 42DOT INC., Seoul (KR)

(72) Inventor: Myoung Hoon Cho, Seoul (KR)

(73) Assignee: 42DOT INC., Seoul (KR)

( * ) Notice: Subject to any disclaimer, the term of this patent is extended or adjusted under 35 U.S.C. 154(b) by 306 days.

(21) Appl. No.: 18/581,444

(22) Filed: Feb. 20, 2024

(65) Prior Publication Data

US 2024/0282072 A1     Aug. 22, 2024

(30) Foreign Application Priority Data

Feb. 20, 2023     (KR) ........................ 10-2023-0022242
Mar. 21, 2023     (KR) ........................ 10-2023-0036897
Mar. 21, 2023     (KR) ........................ 10-2023-0036898

(51) Int. Cl.
*G06V 10/25*          (2022.01)
*G06V 20/56*          (2022.01)
(52) U.S. Cl.
CPC .............. *G06V 10/25* (2022.01); *G06V 20/56* (2022.01); *G06V 2201/07* (2022.01)

(58) Field of Classification Search
CPC ..... G06V 10/25; G06V 20/56; G06V 2201/07
See application file for complete search history.

(56) References Cited

U.S. PATENT DOCUMENTS

2024/0161512 A1*    5/2024   Jiang ...................... G06V 20/58

FOREIGN PATENT DOCUMENTS

KR           102438114 B1      8/2022

* cited by examiner

*Primary Examiner* — Stephen R Koziol
*Assistant Examiner* — Michael Kim Maiden
(74) *Attorney, Agent, or Firm* — Harvest IP Law, LLP

(57) ABSTRACT

A method of generating an improved training data video includes recognizing an object included in a first image by applying at least two recognition techniques to the first image acquired during driving, applying at least two detection techniques to a result of recognizing the object and detecting a frame by each of the applied detection techniques, generating a frame set including a plurality of frames by integrating the detected frames, and generating a second image by sampling the integrated frame set.

12 Claims, 30 Drawing Sheets

(x, y, width, height, moving)

START

RECOGNIZE FIRST OBJECT IN FIRST IMAGE ACQUIRED DURING DRIVING —S1110

DETECT THAT FIRST OBJECT DISAPPEARS FOR CERTAIN PERIOD AND THEN REAPPEARS, IN FIRST IMAGE —S1130

CALCULATE TRAINING DATA FOR FIRST OBJECT WHEN DETECTING THAT FIRST OBJECT REAPPEARS —S1150

CONTROL RECOGNITION MODEL RECOGNIZING OBJECT TO BE TRAINED WITH INFORMATION BASED ON TRAINING DATA —S1170

END

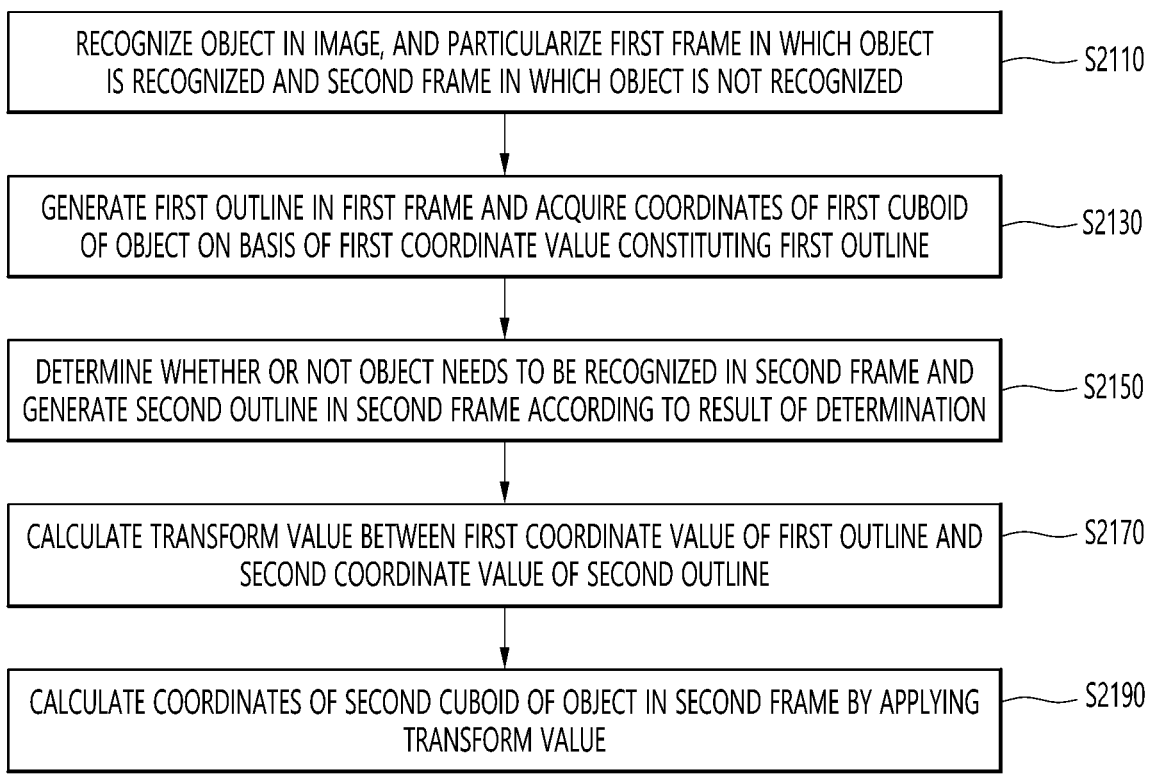

RECOGNIZE OBJECT IN IMAGE, AND PARTICULARIZE FIRST FRAME IN WHICH OBJECT IS RECOGNIZED AND SECOND FRAME IN WHICH OBJECT IS NOT RECOGNIZED — S2110

GENERATE FIRST OUTLINE IN FIRST FRAME AND ACQUIRE COORDINATES OF FIRST CUBOID OF OBJECT ON BASIS OF FIRST COORDINATE VALUE CONSTITUTING FIRST OUTLINE — S2130

DETERMINE WHETHER OR NOT OBJECT NEEDS TO BE RECOGNIZED IN SECOND FRAME AND GENERATE SECOND OUTLINE IN SECOND FRAME ACCORDING TO RESULT OF DETERMINATION — S2150

CALCULATE TRANSFORM VALUE BETWEEN FIRST COORDINATE VALUE OF FIRST OUTLINE AND SECOND COORDINATE VALUE OF SECOND OUTLINE — S2170

CALCULATE COORDINATES OF SECOND CUBOID OF OBJECT IN SECOND FRAME BY APPLYING TRANSFORM VALUE — S2190

RESULT OF OBJECT DETECTION

RESULT OF TRACKING

TIME

FIG. 26

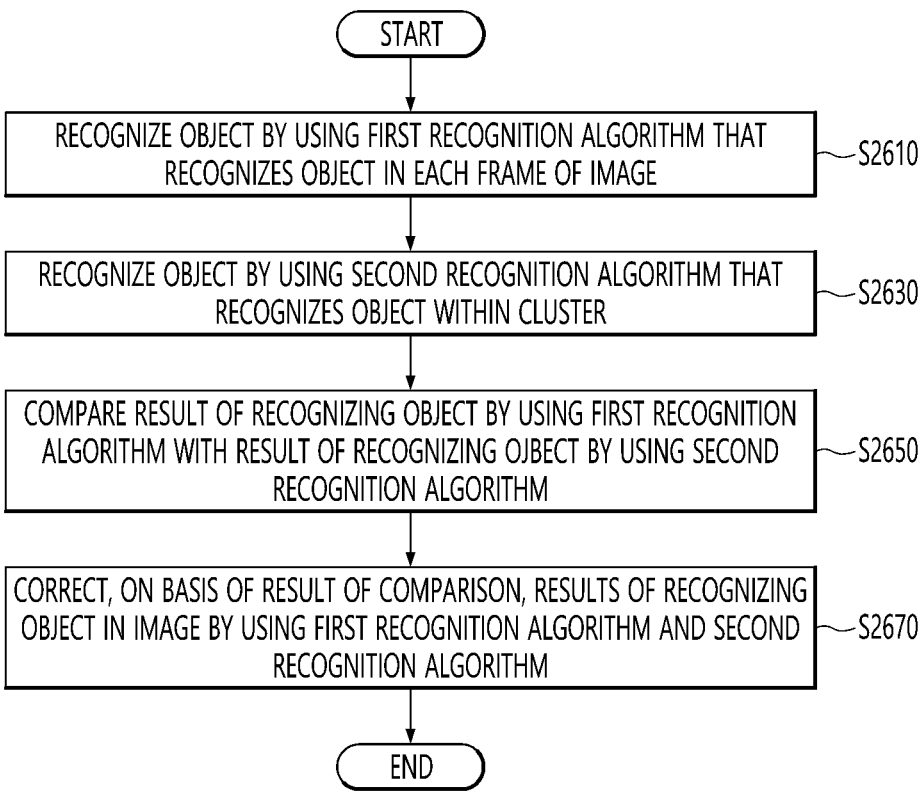

START

RECOGNIZE OBJECT BY USING FIRST RECOGNITION ALGORITHM THAT RECOGNIZES OBJECT IN EACH FRAME OF IMAGE — S2610

RECOGNIZE OBJECT BY USING SECOND RECOGNITION ALGORITHM THAT RECOGNIZES OBJECT WITHIN CLUSTER — S2630

COMPARE RESULT OF RECOGNIZING OBJECT BY USING FIRST RECOGNITION ALGORITHM WITH RESULT OF RECOGNIZING OJBECT BY USING SECOND RECOGNITION ALGORITHM — S2650

CORRECT, ON BASIS OF RESULT OF COMPARISON, RESULTS OF RECOGNIZING OBJECT IN IMAGE BY USING FIRST RECOGNITION ALGORITHM AND SECOND RECOGNITION ALGORITHM — S2670

END

METHOD FOR GENERATING IMPROVED TRAINING DATA VIDEO AND APPARATUS THEREOF

CROSS-REFERENCE TO RELATED APPLICATION

This application claims the benefit of Korean Patent Application No. 10-2023-0022242, filed on Mar. 21, 2023, No. 10-2023-0036897, filed on Feb. 20, 2023, and No. 10-2023-0036898, filed on Mar. 21, 2023 in the Korean Intellectual Property Office, the disclosure of which is incorporated herein in its entirety by reference.

BACKGROUND

1. Field

The present disclosure relates to methods of generating a training data video, and more particularly, to methods capable of generating, through a further improved method, training data for improving performance of recognizing an object on a road during driving by an autonomous vehicle which may recognize an object and may autonomously travel, and apparatuses for implementing the methods.

2. Description of the Related Art

Due to the convergence of information and communication technology and the vehicle industry, the smartization of vehicles has rapidly progressed. Due to smartization, vehicles have evolved from simple mechanical systems to smart cars, in particular, autonomous driving has attracted attention as a core technology of smart cars. Autonomous driving may refer to a technology that allows vehicles to autonomously reach destinations thereof by actively controlling driving states of the vehicles through autonomous driving modules mounted on the vehicles without drivers manipulating steering wheels, accelerator pedals, brakes, or the like.

For safe autonomous driving of autonomous vehicles, various studies have been conducted on methods by which vehicles accurately recognize pedestrians or other vehicles during autonomous driving and calculate distances to the recognized objects. However, there are no currently known methods capable of perfectly recognizing objects on roads because features of objects, which may appear on roads while vehicles travel, are virtually infinite and processing capabilities of modules mounted on autonomous vehicles are limited.

In the case of object recognition and distance estimation through cameras, a lot of information regarding distances may be lost because objects in actual three-dimensional (3D) worlds are projected onto two-dimensional (2D) images. In particular, errors may be great because variations are great in features (such as heights of pedestrians or points in contact with the ground) that are frequently used to calculate locations of pedestrians.

In the case of object recognition and distance estimation through radar, capabilities of quickly identifying and classifying objects may be low due to radio wave characteristics of the radar, and thus, determining whether the objects are pedestrians or vehicles may be not easy. In particular, in the case of pedestrians or two-wheelers (bicycles or motorcycles) on roads, recognition results may tend to be worse because signal strengths are low.

Recently, object recognition and distance estimation technology using LiDAR has been in the spotlight due to relatively high accuracy thereof. However, because high-power lasers are risky, LiDAR may operate on the basis of low-power lasers, unlike radio waves used by the radar, the lasers may be greatly affected by the surrounding environment, and the excessively high costs of lidar sensors is pointed out as a limitation.

The foregoing background art is technical information that the inventor has possessed for derivation of the present disclosure or has acquired during the derivation process of the present disclosure, and may not be necessarily known art disclosed to the general public prior to the filing of the present disclosure.

SUMMARY

Provided are methods of generating an improved training data video.

Additional aspects will be set forth in part in the description which follows and, in part, will be apparent from the description, or may be learned by practice of the presented embodiments.

According to an aspect of an embodiment, a method includes recognizing an object included in a first image by applying at least two recognition techniques to the first image acquired during driving, applying at least two detection techniques to a result of recognizing the object and detecting a frame by each of the applied detection techniques, generating a frame set including a plurality of frames by integrating the detected frames, and generating a second image by sampling the integrated frame set.

The generating of the second image may include generating, on the basis of the integrated frame set, a frame group including at least one frame and including frames that do not overlap each other, and generating the second image by extracting a frame in each frame group.

The generating of the second image may include generating the second image by extracting one frame in each frame group.

The generating of the second image may include generating the second image by extracting, in each frame group, a number of frames corresponding to a weight set for each frame group.

The weight set for each frame group may be a value determined on the basis of a number of frames included in each frame group.

The generating of the second image may include extracting a plurality of frames by sampling, on the basis of a preset time interval, frames included in the integrated frame set, and generating the second image with the extracted frames.

The generating of the detected frame set may include identifying a frame repeatedly detected from among frames detected by the respective detection techniques, and the generating of the second image may include generating the second image by essentially including the repeatedly detected frame therein.

The recognizing of the object included in the first image may include recognizing the object included in the first image by applying a first recognition technique and a second recognition technique, the first recognition technique may be an algorithm recognizing the object in the first image on the basis of YoloV4-CSP, and the second recognition technique may be an algorithm recognizing the object in the first image on the basis of YoloV4-P7.

The at least two recognition techniques may include a first recognition technique and a second recognition technique, and the at least two detection techniques may include a detection technique detecting a frame on the basis of a result of comparing frames of objects respectively recognized by the first recognition technique and the second recognition technique.

The at least two detection techniques may include a detection technique detecting a frame on the basis of a result of detecting that the object recognized in the first image disappears for a certain period and then reappears.

According to an aspect of another embodiment, an apparatus includes a memory storing at least one program, and a processor configured to perform a calculation by executing the at least one program, wherein the processor is configured to recognize an object included in a first image by applying at least two recognition techniques to the first image acquired during driving, apply at least two detection techniques to a result of recognizing the object and detect a frame by each of the applied detection techniques, generate a frame set including a plurality of frames by integrating the detected frames, and generate a second image by sampling the integrated frame set.

According to an aspect of another embodiment, a method includes recognizing an object in an image, particularizing a first frame in which the object is recognized and a second frame in which the object is not recognized, generating a first outline for the object in the first frame and acquiring coordinates of a first cuboid of the object on the basis of a first coordinate value constituting the first outline, determining whether or not the object needs to be recognized in the second frame and generating, on the basis of a result of the determination, a second outline for the object in the second frame, calculating a transform value between the first coordinate value of the first outline and a second coordinate value constituting the second outline, and calculating coordinates of a second cuboid of the object in the second frame by applying the transform value to the coordinates of the first cuboid.

According to an aspect of another embodiment, an apparatus includes a memory storing at least one program, and a processor configured to perform a calculation by executing the at least one program, wherein the processor is configured to recognize an object in an image, particularize a first frame in which the object is recognized and a second frame in which the object is not recognized, generate a first outline for the object in the first frame, acquire coordinates of a first cuboid of the object on the basis of a first coordinate value constituting the first outline, determine whether or not the object needs to be recognized in the second frame, generate, on the basis of a result of the determination, a second outline for the object in the second frame, calculating a transform value between the first coordinate value of the first outline and a second coordinate value constituting the second outline, and calculate coordinates of a second cuboid of the object in the second frame by applying the transform value to the coordinates of the first cuboid.

According to an aspect of another embodiment, a method includes recognizing an object included in an image by using a first recognition algorithm recognizing an object in each frame of an image, forming a track with a plurality of frames included in the image and recognizing the object by using a second recognition algorithm recognizing an object in the track, comparing a result of recognizing the object by using the first recognition algorithm with a result of recognizing the object by using the second recognition algorithm, and correcting, on the basis of a result of the comparison, the results of recognizing the object in the image by using the first recognition algorithm and the second recognition algorithm.

According to an aspect of another embodiment, an apparatus includes a memory storing at least one program, and a processor configured to perform a calculation by executing the at least one program, wherein the processor is configured to recognize an object included in an image by using a first recognition algorithm recognizing an object in each frame in an image, form a track with a plurality of frames included in the image, recognize the object by using a second recognition algorithm recognizing an object included in the track, compare a result of recognizing the object by using the first recognition algorithm with a result of recognizing the object by using the second recognition algorithm, and correct, on the basis of a result of the comparison, the results of recognizing the object by using the first recognition algorithm and the second recognition algorithm.

According to an aspect of another embodiment, provided may be a computer-readable recording medium that stores a program for executing the methods.

BRIEF DESCRIPTION OF THE DRAWINGS

These and/or other aspects will become apparent and more readily appreciated from the following description of the embodiments, taken in conjunction with the accompanying drawings in which:

FIG. 21 is a flowchart illustrating an example of a cuboid acquisition method, according to the present disclosure;

FIG. 26 is a flowchart illustrating an example of an object recognition rate improvement method according to the present disclosure.

DETAILED DESCRIPTION

Figure 1:
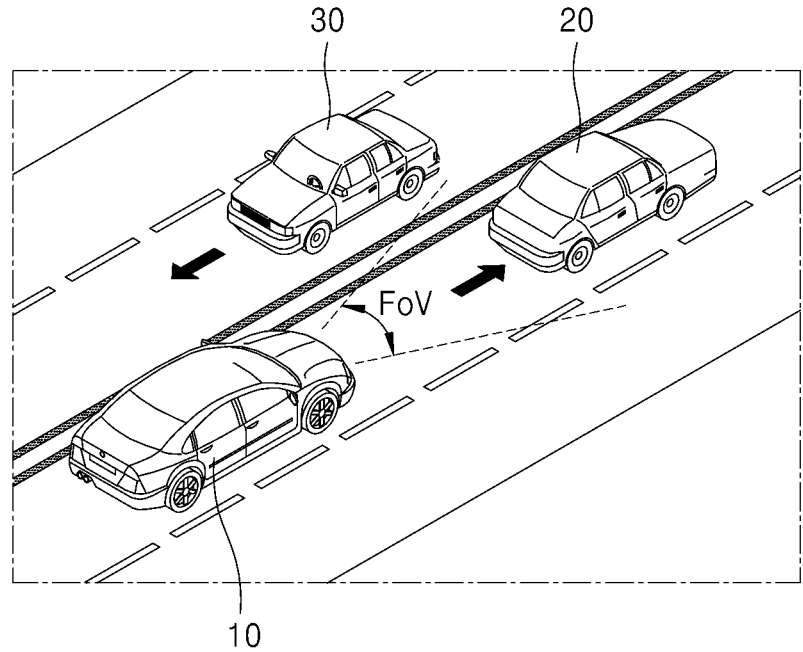
FIGS. 1 to 3 are diagrams illustrating an autonomous driving method according to an embodiment.

The present disclosure may be modified in various ways and may have various embodiments, particular embodiments will be illustrated in the drawings and described in detail in the description. Advantages and features of the present disclosure, and methods of achieving the same will become clear with reference to the description of embodiments taken in conjunction with the accompanying drawings. However, it should be understood that the present disclosure is not limited to embodiments presented below, but may be implemented in various different forms.

Hereinafter, embodiments will be described in detail with reference to the accompanying drawings, and when describing with reference to the drawings, identical or corresponding components will be assigned the same reference numerals and the same description thereof will be omitted.

In the following embodiments, the terms first, second, etc. may be only used herein to distinguish one component from another, not for limited sense.

In the following embodiments, the singular forms are intended to include the plural forms as well, unless the context clearly indicates otherwise.

The terms "comprise", "include", and/or "have" when used herein, specify the presence of stated features, elements, and/or components, but do not preclude the presence or addition of one or more other features, elements, and/or components.

In the cases where an embodiment may be implemented differently, a particular process sequence may be performed differently from the described sequence. For example, two processes described in succession may be performed substantially at the same time, or may be performed in an order opposite to the order described.

Figure 2:
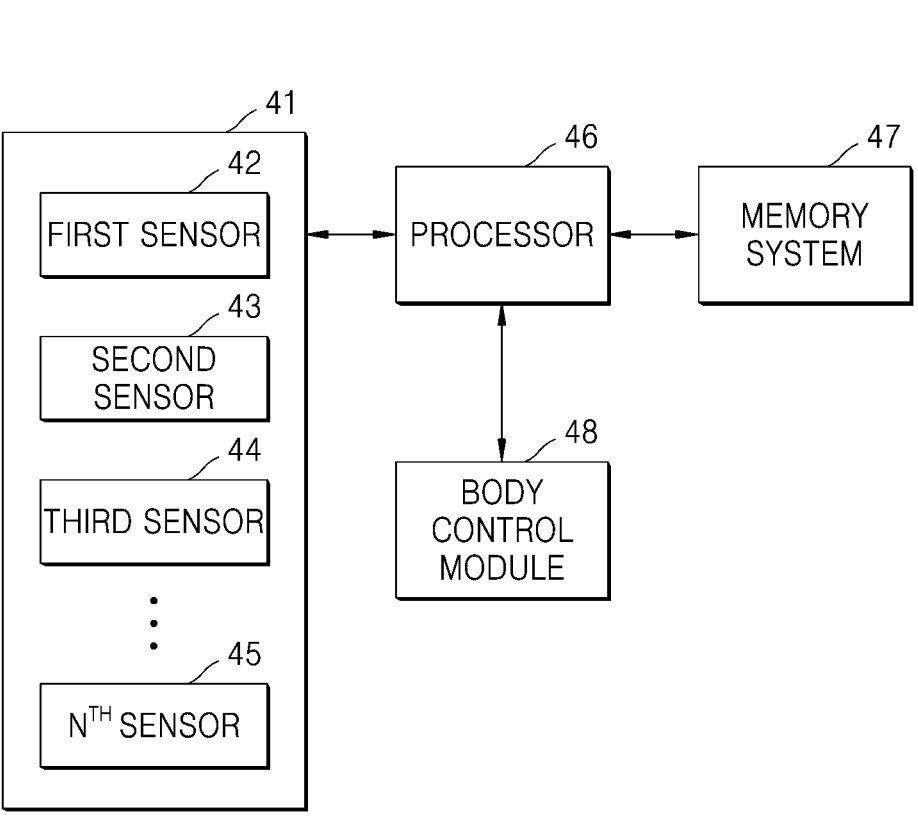
Figure 3:
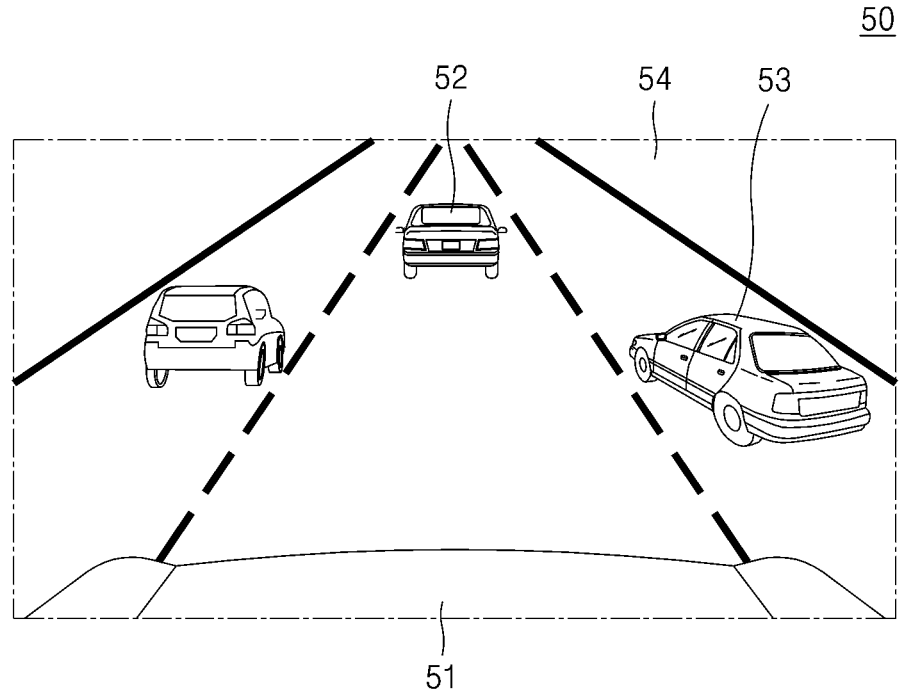

FIGS. 1 to 3 are diagrams illustrating an autonomous driving method according to an embodiment.

Referring to FIG. 1, an autonomous driving apparatus according to an embodiment may be mounted on a vehicle to implement an autonomous vehicle 10. The autonomous driving apparatus mounted on the autonomous vehicle 10 may include various types of sensors for collecting surrounding situation information. As an example, the autonomous driving apparatus may detect movement of a preceding vehicle 20 running in front via an image sensor and/or an event sensor mounted on the front of the autonomous vehicle 10. The autonomous driving apparatus may further include sensors for detecting the front side of the autonomous vehicle 10, another driving vehicle 30 operating in a side lane, a pedestrian around the autonomous vehicle 10, and the like.

As illustrated in FIG. 1, at least one of sensors for collecting situational information around the autonomous vehicle 10 may have a certain field of view (FoV). As an example, when a sensor mounted on the front of the autonomous vehicle 10 has a field of view (FoV) as shown in FIG. 1, information detected from the center of the sensor may have a relatively high significance. In other words, the information detected from the center of the sensor may have the relatively high significance because most of information corresponding to movement of the preceding vehicle 20 is included in the information detected from the center of the sensor.

The autonomous driving apparatus may control the movement of the autonomous vehicle 10 by processing, in real time, information collected by sensors of the autonomous vehicle 10, and may store, in a memory device, at least some of the information collected by the sensors.

Referring to FIG. 2, an autonomous driving apparatus 40 may include a sensor unit 41, a processor 46, a memory system 47, a body control module 48, and the like. The sensor unit 41 may include a plurality of sensors 42 to 45, and the plurality of sensors 42 to 45 may include an image sensor, an event sensor, an illuminance sensor, a GPS device, an acceleration sensor, and the like.

Data collected by the sensors 42 to 45 may be transmitted to the processor 46. The processor 46 may store, in the memory system 47, the data collected by the sensors 42 to 45, and may determine movement of a vehicle by controlling the body control module 48 on the basis of the data collected by the sensors 42 to 45. The memory system 47 may include two or more memory devices, and a system controller for controlling the memory devices. Each of the memory devices may be provided as a single semiconductor chip.

In addition to the system controller of the memory system 47, each of the memory devices included in the memory system 47 may include a memory controller, and the memory controller may include an artificial intelligence (AI) operation circuit, such as a neural network. The memory controller may generate calculation data by assigning a certain weight to data received from the sensors 42 to 45 or the processor 46, and may store the calculation data in a memory chip.

FIG. 3 is a view illustrating an example of image data acquired by a sensor of an autonomous vehicle having an autonomous driving apparatus mounted thereon. Referring to FIG. 3, image data 50 may be data acquired by a sensor mounted on the front of an autonomous vehicle. Therefore, the image data 50 may include a front portion 51 of the autonomous vehicle, a preceding vehicle 52 on the same lane as the autonomous vehicle, a driving vehicle 53 around the autonomous vehicle, an uninterested region 54, and the like.

From among the image data 50 according to the embodiment shown in FIG. 3, data of regions in which the front portion 51 of the autonomous vehicle and the uninterested region 54 appear may be data that is unlikely to affect operation of the autonomous vehicle. In other words, the front portion 51 of the autonomous vehicle and the uninterested region 54 may be regarded as data having a relatively low significance.

However, a distance to the preceding vehicle 52, movement of the driving vehicle 53 to change a lane, and the like may be highly significant factors for safe operation of the autonomous vehicle. Accordingly, from among the image data 50, data of a region including the preceding vehicle 52, the driving vehicle 53, and the like may have a relatively high significance for the operation of the autonomous vehicle.

A memory device of the autonomous driving apparatus may store the image data 50 received from the sensor by assigning different weights to respective regions of the image data 50. For example, a high weight may be assigned to the data of the region including the preceding vehicle 52, the driving vehicle 53, and the like, and a low weight may be assigned to the data of the regions in which the front portion 51 of the autonomous vehicle and the uninterested region 54 appear.

Figure 4A:
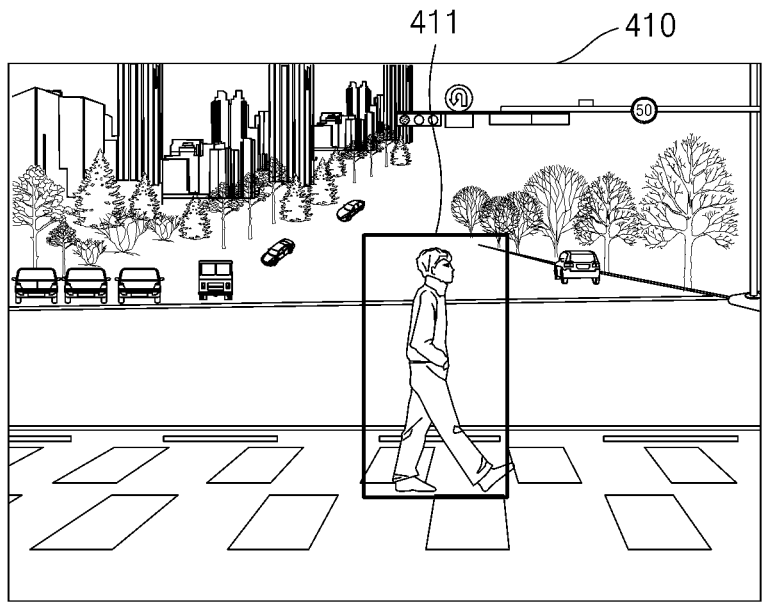
FIGS. 4A and 4B are views related to a camera that captures the outside of a vehicle, according to an embodiment.
Figure 4B:
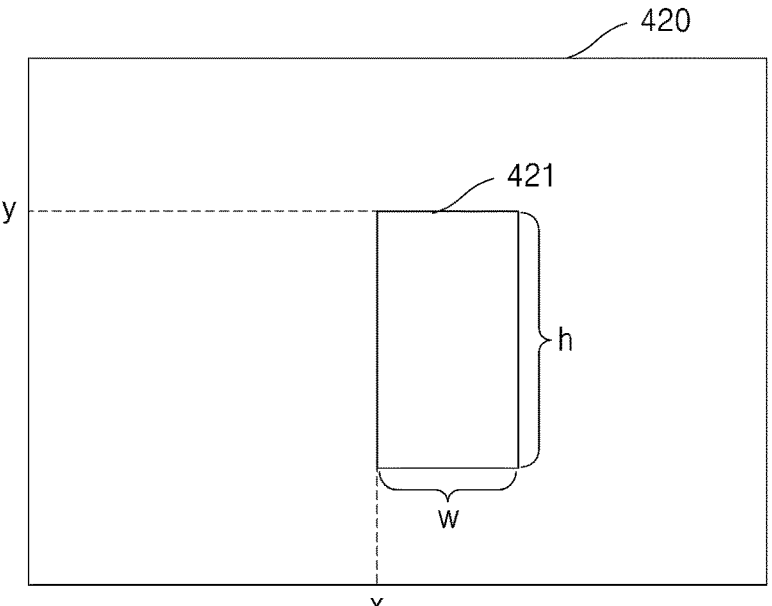

FIGS. 4A and 4B are views related to a camera that captures the outside of a vehicle, according to an embodiment.

The camera may be mounted on the vehicle and capture the outside of the vehicle. The camera may capture the front, sides, rear, and the like of the vehicle. An object recognition rate improvement apparatus according to the present disclosure may acquire a plurality of images captured by the camera. The plurality of images captured by the camera may include a plurality of objects.

Information regarding the objects may include object type information and object attribute information. Here, the object type information may be index information indicating the types of objects and include a group as a great range and a class as a detailed range. Also, the object attribute information may indicate attribute information regarding current states of the objects and include motion information, rotation information, traffic information, color information, visibility information, and the like.

In an embodiment, the group and class included in the object type information may be as shown in Table 1 below, but are not limited thereto.

TABLE 1

| Group | Class |
|---|---|
| Flat | Road, Sidewalk, Parking, Ground, Crosswalk |
| Human | Pedestrian, Rider |
| Vehicle | Car, Truck, Bus |
| Construction | Building Wall, Guard rail, Tunnel, fence, gas station, pylon |
| Object | Pole, Traffic sign, Traffic light, color corn |
| Nature | vegetation, terrain, paddy field, river, lake |
| Void | Static |
| Lane | Dotted line, Solid line, Dotted and Solid line, Double Solid line |
| Sky | Sky |
| Animal | Dog, Cat, bird |

The motion information may express motion information regarding the objects and may be defined as stopping, parking, moving, or the like. In the case of a vehicle, stopping, parking, and moving may be determined as object attribute information, in the case of a pedestrian, moving, stopping, and being unknown may be determined as object attribute information, and in the case of an immovable object such as traffic lights, stopping, which is a default value, may be determined as object attribute information.

The rotation information may express rotation information regarding an object and may be defined as front, rear, horizontal, vertical, side, or the like. In the case of the vehicle, object attribute information may be determined by the front, rear, and side, and in the case of traffic lights in a horizontal or vertical direction, object attribute information may be determined horizontally or vertically, respectively.

The traffic information may refer to traffic information regarding an object and may be defined as an instruction, a caution, a regulation, an auxiliary sign, and the like of a traffic sign. The color information may refer to color information regarding an object and may express a color of the object and colors of a traffic light, and a traffic sign.

Referring to FIG. 4A, an object 411 may be a pedestrian. An image 410 may have a certain size. A plurality of images 410 may include the same object 411, but when a vehicle travels along a road, relative locations of the vehicle and the object 411 continue to change, the object 411 may also move over time, and accordingly, the location of even the same object 411 changes within each image.

In the case where all images are used to determine which object is the same in the respective images, an amount of data transmitted and computation increases significantly. Accordingly, processing through edge computing may not be easy in an apparatus mounted on the vehicle, and real-time analysis may also not be easy.

FIG. 4B illustrates a bounding box 421 included in an image 420. A bounding box may be metadata regarding an object, and bounding box information may include object type information (e.g., a group, a class, and the like), location information, size information, and the like on the image 420.

Referring to FIG. 4B, the bounding box information may include information indicating that the object 411 corresponds to a pedestrian class, information indicating that the upper left vertex of the object 411 is located at (x, y) on the image 420, information indicating that a size of the object 411 is w×h, and current state information (i.e., motion information) indicating that the object 411 is moving.

Figure 5:
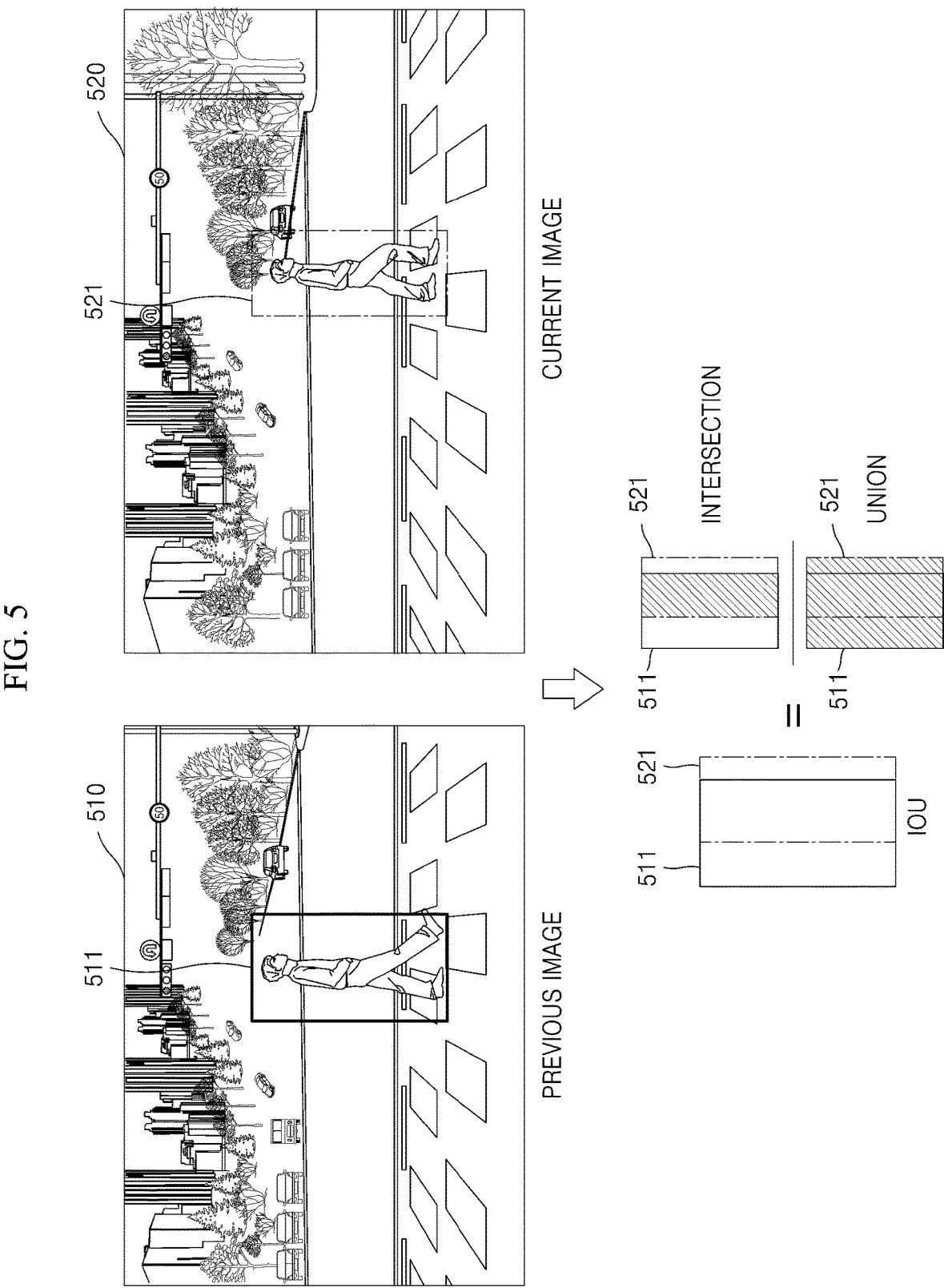
FIG. 5 is a schematic view illustrating an object recognition method according to an embodiment.

FIG. 5 is a schematic view illustrating an object recognition method according to an embodiment.

The object recognition rate improvement apparatus may acquire a plurality of frames by splitting a video acquired from a camera into frames. The plurality of frames may include a previous frame 510 and a current frame 520.

The object recognition rate improvement apparatus may recognize a first pedestrian object 511 in the previous frame 510.

In an embodiment, the object recognition rate improvement apparatus may split a frame into grids of the same size, predict, for each grid, the number of bounding boxes designated in a predefined form on the basis of the center of the grid, and calculate confidence on the basis of the same. The object recognition rate improvement apparatus may determine whether or not a frame includes an object or includes only a background, select a location having high object confidence, determine an object category, and recognize the object as a result. However, the method of recognizing an object in the present disclosure is not limited thereto.

The object recognition rate improvement apparatus may acquire first location information regarding the first pedestrian object 511 recognized in the previous frame 510. As described above with reference to FIGS. 4A and 4B, the first location information may include coordinate information of any one vertex (e.g., the upper left vertex) of the bounding box corresponding to the first pedestrian object 511 in the previous frame 510, and horizontal and vertical length information of the bounding box.

Also, the object recognition rate improvement apparatus may acquire second location information regarding a second pedestrian object 521 recognized in the current frame 520.

The object recognition rate improvement apparatus may determine a similarity between the first location information regarding the first pedestrian object 511 recognized in the previous frame 510 and the second location information regarding the second pedestrian object 521 recognized in the current frame 520.

Referring to FIG. 5, by using the first location information and the second location information, the object recognition rate improvement apparatus may calculate an intersection and a union between the first pedestrian object 511 and the second pedestrian object 521. The object recognition rate improvement apparatus may calculate a value of an intersection region compared to a union region and when the calculated value is greater than or equal to a threshold value, determine that the first pedestrian object 511 and the second pedestrian object 521 are the same pedestrian object.

However, the method of determining an identity between objects is not limited to the above-described method.

Figure 6:
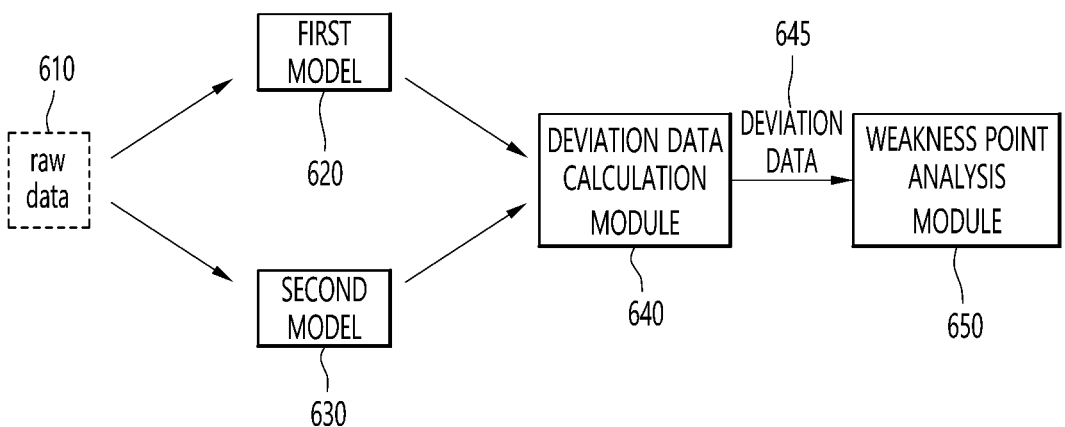
FIG. 6 is a view conceptually illustrating a method of improving an object recognition rate of an autonomous vehicle, according to an embodiment.

FIG. 6 is a view conceptually illustrating a method of improving an object recognition rate of an autonomous vehicle, according to an embodiment.

To summarize an embodiment with reference to FIG. 6, in an embodiment, when raw data 610 is input through a first model 620 and a second model 630, a deviation data calculation module 640 may receive and process result data calculated by each of the first model 620 and the second model 630 to calculate deviation data 645, and a weakness generated by the camera module, and may include a plurality of frames, and a frame rate may be 30 frames or 60 frames per one second, but is not limited thereto.

The first model 620 may be a model installed in the autonomous vehicle and may refer to a model that receives the raw data 610 as input data and outputs, as output data, the result of recognizing an object included in the raw data 610.

The second model 630 may be a model included in a server and like the first model 620, may refer to a model that receives the raw data 610 as input data and outputs, as output data, the result of recognizing the object included in the raw data 610. The second model 630 may be a high-performance model that may use sufficient resources on the basis of a great memory compared to the first model 620 which does not have high performance due to limited resources.

The camera module of the autonomous vehicle may be controlled so that the raw data 610 collected through a communication module may be transmitted not only to the first model 620 but also to the second model 630 and processed.

The output data, which is output from the first model 620 and the second model 630, may include information regarding at least one piece of information regarding relative locations, sizes, and directions of a vehicle, a pedestrian, and the like included in each frame of an image.

In the present disclosure, due to features of the first model 620 installed in the autonomous vehicle, the first model 620 may have relatively limited resources and operate in a limited environment, compared to the second model 630. Due to a difference in model scale as described above, when the raw data 610 is input into the second model 630, information regarding the number and types of objects recognized in the image may be more improved information than information regarding the number and types of objects recognized when the raw data 610 is input into the first model 620.

TABLE 2

| Class | Images | Targets | P | R | mAP@.5 | mAP@.5:.95: |
|---|---|---|---|---|---|---|
| all | 6.74e+03 | 7.57e+04 | 0.497 | 0.888 | 0.861 | 0.598 |
| car | 6.74e+03 | 4.26e+04 | 0.594 | 0.928 | 0.918 | 0.683 |
| pedestrian | 6.74e+03 | 1.46e+04 | 0.46 | 0.861 | 0.82 | 0.491 |
| truck | 6.74e+03 | 6.49e+03 | 0.501 | 0.886 | 0.862 | 0.626 |
| bus | 6.74e+03 | 5.85e+03 | 0.542 | 0.937 | 0.923 | 0.704 |
| two wheeler | 6.74e+03 | 5.67e+03 | 0.434 | 0.85 | 0.807 | 0.5 |
| misc | 6.74e+03 | 484 | 0.451 | 0.866 | 0.832 | 0.583 |

TABLE 3

| Class | Images | Targets | P | R | mAP@.5 | mAP@.5:.95: |
|---|---|---|---|---|---|---|
| all | 6.74e+03 | 7.57e+04 | 0.629 | 0.96 | 0.943 | 0.754 |
| car | 6.74e+03 | 4.26e+04 | 0.724 | 0.98 | 0.976 | 0.812 |
| pedestrian | 6.74e+03 | 1.46e+04 | 0.619 | 0.956 | 0.938 | 0.691 |
| truck | 6.74e+03 | 6.49e+03 | 0.6 | 0.967 | 0.948 | 0.782 |
| bus | 6.74e+03 | 5.85e+03 | 0.631 | 0.976 | 0.965 | 0.815 |
| two wheeler | 6.74e+03 | 5.67e+03 | 0.609 | 0.934 | 0.914 | 0.682 |
| misc | 6.74e+03 | 484 | 0.591 | 0.95 | 0.916 | 0.745 | point analysis module 650 may receive and analyze the calculated deviation data 645 to identify a weakness point.

In more detail, in the present disclosure, the raw data 610 may refer to an image collected by a camera module mounted on the autonomous vehicle. In particular, the raw data 610 may be video data that is not pre-processed after Table 2 and Table 3 are examples showing numerical values of performance of the first model 620 and the second model 630. In more detail, Table 2 shows an object recognition rate when YoloV4-CSP is used as the first model 620, and Table 3 shows an object recognition rate when as YoloV4-P7 is used as the second model 630. Comparing Table 2 and Table 3, with respect to recognition rates of a car, a pedestrian, a truck, a bus, a two-wheeler, and miscellaneous (misc) as objects included in the raw data 610, YoloV4-P7 may be overall superior to YoloV4-CSP.

Table 2 and Table 3 illustrate numerical values of performance of the first model 620 and the second model 630, and thus, the first model 620 and the second model 630 in the present disclosure are not limited to YoloV4-CSP and YoloV4-P7, respectively, described in Table 2 and Table 3.

The deviation data calculation module 640 may calculate the deviation data 645 by analyzing the output data from the first model 620 and the second model 630. The deviation data 645 may refer to data regarding a deviation between the result of inputting the raw data 610 into the first model 620 and the result of inputting the raw data 610 into the second model 630, and more particularly, may be calculated by comparing the results for each same frame. For example, when the raw data 610 is video data including 10 frames, the deviation data 645 may be the result of calculating a deviation between the result of inputting a first frame of the raw data 610 into the first model 620 and the result of inputting the first frame of the raw data 610 into the second model 630.

The deviation data calculation module 640 may calculate intersection over union (IoU) values of bounding boxes in respective frames constituting the raw data 610, match bounding boxes having the greatest IoU value with each other, as a result of the matching, determine a bounding box detected only in the output data from the second model 630 to be a weakness point target, and transmit the determined weakness point target to the weakness point analysis module 650. The method by which the deviation data calculation module 640 calculates deviation data by matching bounding boxes of frames on the basis of IoU values is as described above with reference to FIG. 5 and thus is omitted.

Hereinafter, data output by inputting the raw data 610 into the first model 620 may be referred to as a first recognition result, and data output by inputting the raw data 610 into the second model 630 may be referred to as a second recognition result.

The weakness point analysis module 650 may receive the deviation data 645 from the deviation data calculation module 640 and analyze a weakness point. Here, the weakness point may refer to data regarding undetected information when an object detected by the second model 630 is not detected by the first model 620 due to limited performance of the first model 620 which is installed in the autonomous vehicle and has a relatively low calculation amount compared to the second model 630. For example, when the second model 630 receives the raw data 610 and recognize one car and one bus as objects in an image and the first model 620 receives the raw data 610 and recognizes one car as an object in the image, the weakness point may be information regarding one bus that is recognized (detected) by the first model 620.

The weakness point analyzed by the weakness point analysis module 650 may be used as training data for improving object recognition performance of the first model 620. Also, the weakness point may be preprocessed through a series of preprocessing processes (or filtering processes) to be used as the training data for the first model 620 and is described below.

The first model 620, the deviation data calculation module 640, and the weakness point analysis module 650 illustrated in FIG. 6 may be implemented in the form physically or logically included in the object recognition rate improvement apparatus for the autonomous vehicle according to an embodiment. In addition, the first model 620, the second model 630, the deviation data calculation module 640, and the weakness point analysis module 650 illustrated in FIG. 6 may be referred to as different names when the present disclosure is actually implemented and may be implemented in a form in which one module is integrated into another.

Figure 7A:
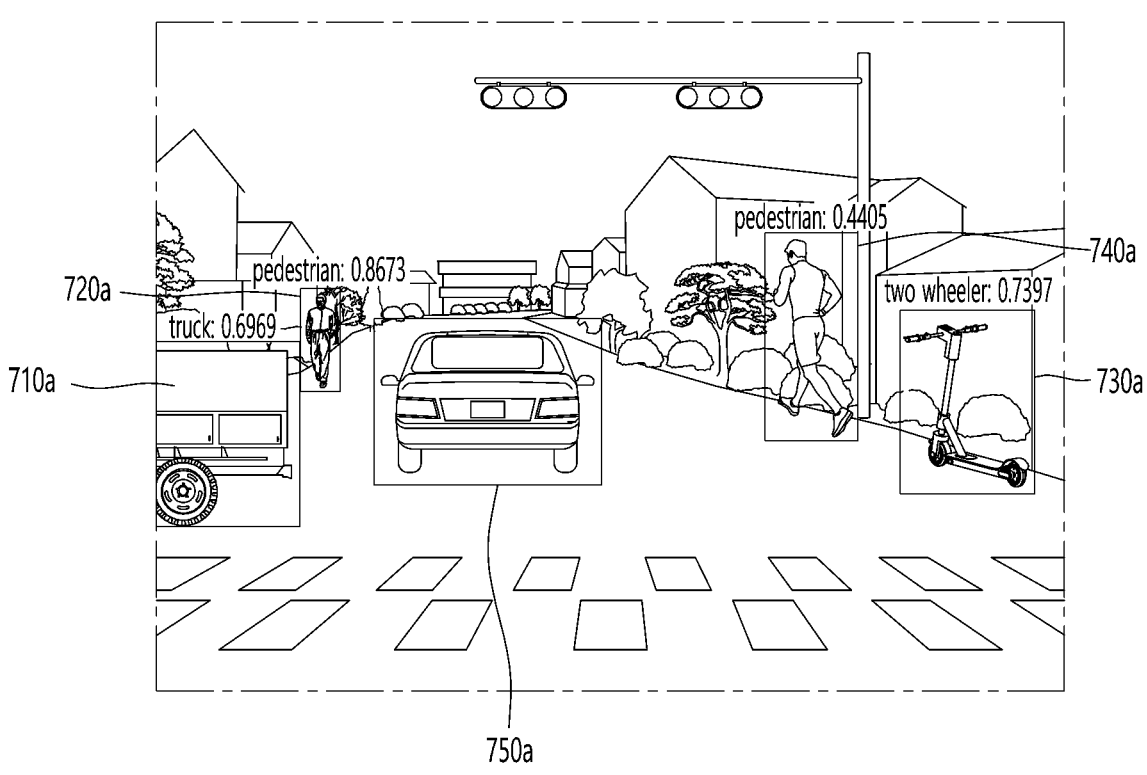
FIGS. 7A to 7C are views illustrating a filtering process performed by an object recognition rate improvement apparatus, according to an embodiment.
Figure 7B:
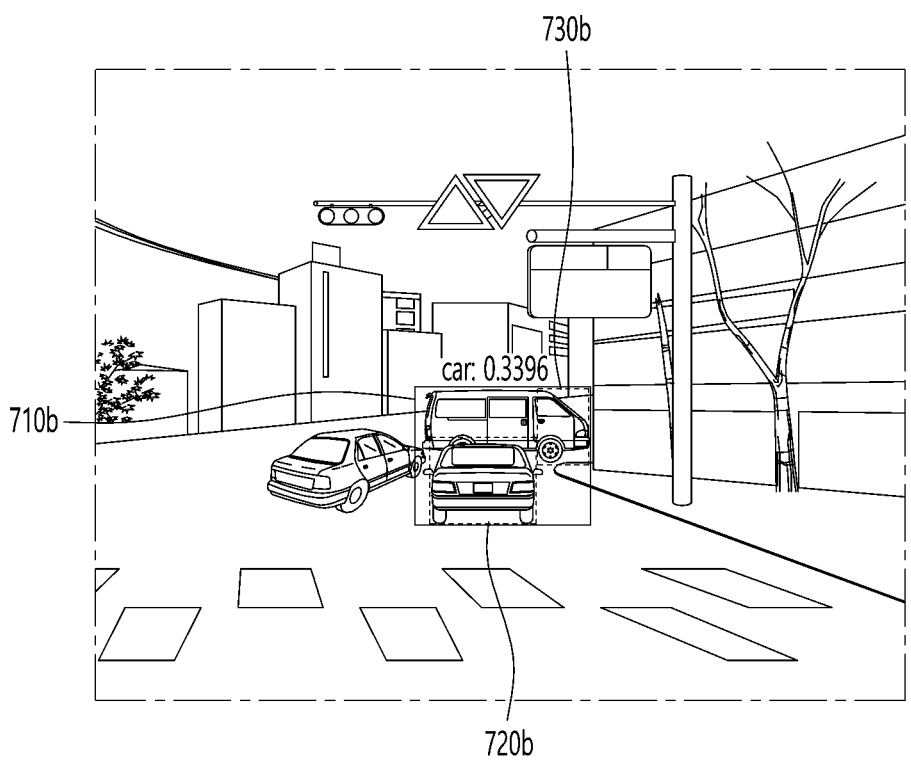
Figure 7C:
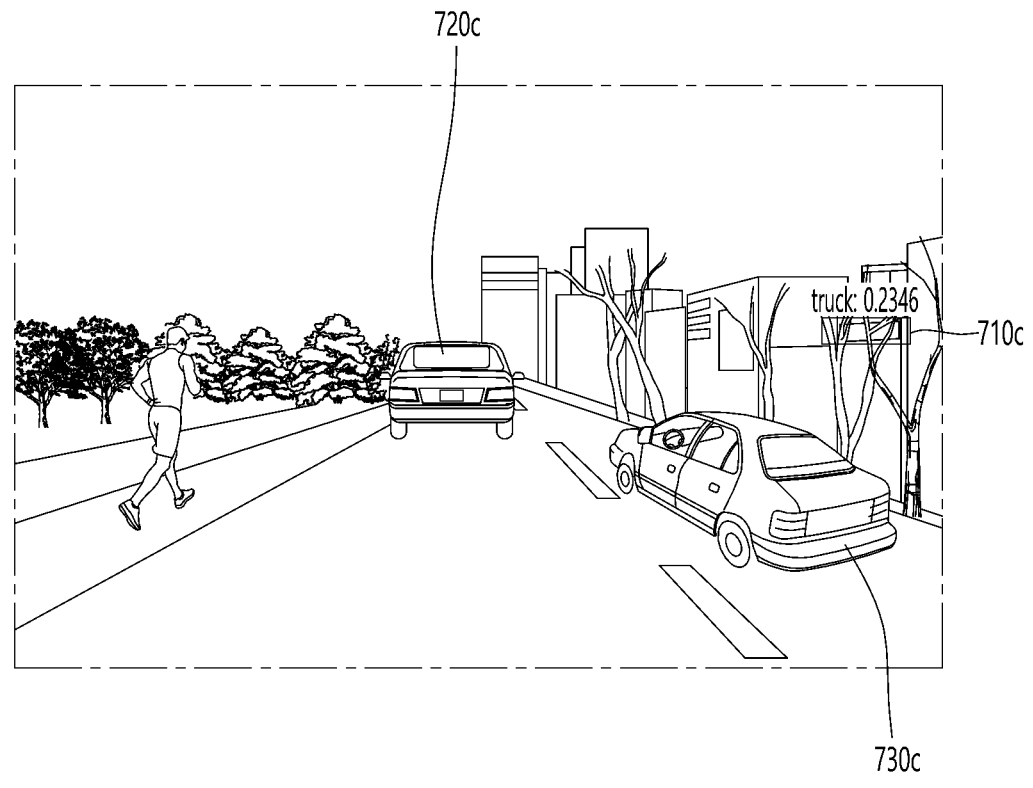

FIGS. 7A to 7C are views illustrating a filtering process performed by an object recognition rate improvement apparatus, according to an embodiment.

FIG. 7A shows deviation data before being filtered, and FIG. 7A schematically illustrates that a first object 710a, a second object 720a, a third object 730a, a fourth object 740a, and a fifth object 750a are recognized as objects. In more detail, five objects shown in FIG. 7A may not be recognized in a first recognition result, but may be recognized in a second recognition result, processed into deviation data, and transmitted to the weakness point analysis module 650, and the weakness point analysis module 650 may perform filtering on the basis of a preset filter criterion and leave only meaningful object information in the deviation data.

As an example, the preset filter criterion may be a size criterion for a size of a bounding box included in the deviation data, and the weakness point analysis module 650 may remove a bounding box having a size smaller than the size criterion which is information based on the deviation data. Here, the size criterion may be a criterion for removing a bounding box having a height of less than 120 pixels or a width of less than 120 pixels. However, the above-described value may be an example value and, according to embodiments, the criterion value for the height or width may vary.

As another example, the preset filter criterion may be a classification criterion for classifying a type of object in the bounding box included in the deviation data, and the weakness point analysis module 650 may remove a bounding box of a particular type of object according to the classification criterion which is the information based on the deviation data. Here, the particular type may refer to a class written above an upper end of the bounding box, and a total of four types of classes (e.g., a car, a truck, a pedestrian, and a two-wheeler) are shown above the five bounding boxes of FIG. 7A.

When the size criterion for removing the bounding box having the height of less than 120 pixels or the width of less than 120 pixels and the classification criterion for removing a bounding box for the pedestrian or the two-wheeler are simultaneously set in the filter criterion set in the weakness point analysis module 650, in FIG. 7A, the second object 720a, the third object 730a, and the fourth object 740a may be removed, and the first object 710a and the fifth object 750a may remain.

Like the illustration in FIG. 7A, FIG. 7B illustrates deviation data before being filtered, and FIG. 7B schematically illustrates that a sixth object 710b is recognized as an object.

In more detail, the sixth object 710b shown in FIG. 7B may not be recognized in a first recognition result, but may be recognized in a second recognition result, processed into deviation data, and transmitted to the weakness point analysis module 650, and the weakness point analysis module 650 may perform filtering on the basis of a preset filter criterion and leave only meaningful object information in the deviation data.

However, as illustrated in FIG. 7B, the sixth object 710b may not be one object, but may be mistakenly recognized as one object in a process of accidentally overlapping a seventh object 720*b* and an eighth object 730*b*, and excessively low confidence of 0.3396 may be recorded due to the feature of a shape thereof.

As an example, the preset filter criterion in FIG. 7B may be a confidence criterion for confidence of a bounding box included in the deviation data, and the weakness point analysis module 650 may remove the bounding box having lower confidence than the confidence criterion which is information based on the deviation data. Here, the confidence criterion may be 0.6 but may vary according to embodiments.

In FIG. 7B, the weakness point analysis module 650 may remove the bounding box of the sixth object 710*b* according to the confidence criterion, and after the bounding box of the sixth object 710*b* is removed, a bounding box does not remain in a frame of FIG. 7B, and thus, the first recognition result and the second recognition result may be considered to be substantially the same as each other. The first recognition result and the second recognition result being substantially the same as each other may indicate that the first model 620 does not need to learn the sixth object 710*b*.

Like the illustrations in FIGS. 7A and 7B, FIG. 7C illustrates deviation data before being filtered, and FIG. 7C schematically illustrates that a ninth object 710*c*, a tenth object 720*c*, and an eleventh object 730*c* are recognized as objects.

In more detail, from among the objects shown in FIG. 7C, the tenth object 720*c* and the eleventh object 730*c* may be vehicles which are recognized as objects in both a first recognition result and a second recognition result and from which bounding boxes are removed. FIG. 7C illustrates that although the ninth object 710*c* is an object that is unlikely to affect driving of an autonomous vehicle that travels on a road, the ninth object 710*c* is classified into a class referred to as a truck and a bounding box is applied thereto.

In general, the number of objects, which are recognized by the second model 630 having higher recognition performance, may be great, but in certain cases, the first model 620 may misrecognize a non-object as an object, or the second model 630 may malfunction and thus may misrecognize, as a normal object, an object that is a non-object and thus is not recognized by the first model 620, and the weakness point analysis module 650 may determine, according to the preset filter criterion, that the ninth object 710*c* is present, as an object present only on a road, at a location which is not an actual road, to remove the bounding box. As illustrated in FIG. 7C, when the bounding box of the ninth object 710*c* is removed, a deviation may not occur between the first recognition result and the second recognition result, and thus, data for the first model 620 to learn may also naturally disappear.

Figure 8:
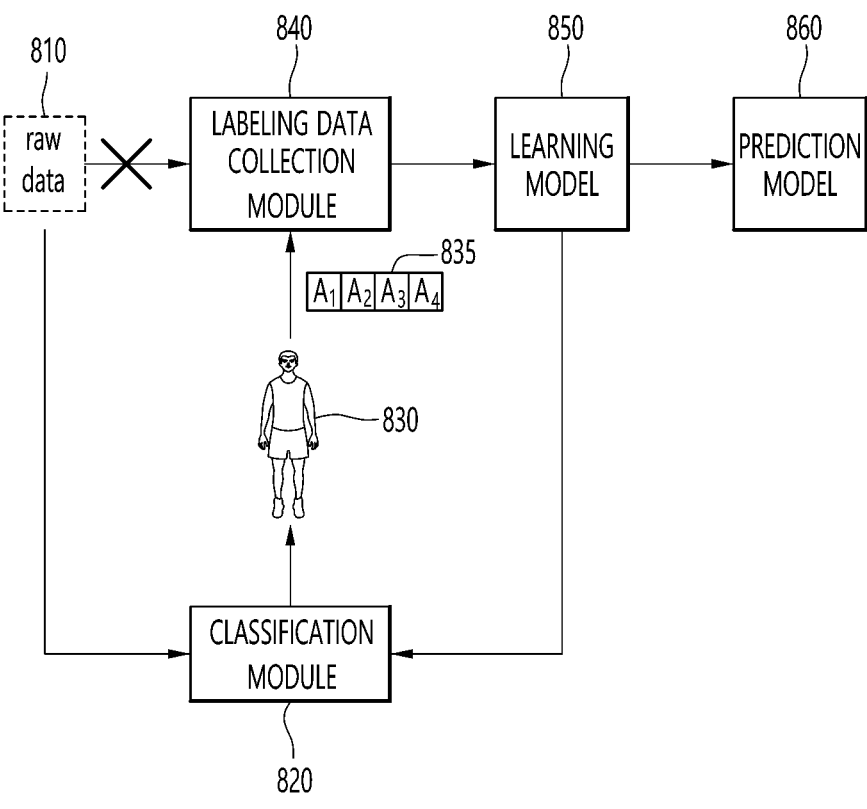
FIG. 8 is a diagram illustrating a process of applying active learning to improve an object recognition rate of an autonomous vehicle, according to an embodiment.

FIG. 8 is a diagram illustrating a process in which active learning is applied to improve an object recognition rate of an autonomous vehicle, according to an embodiment.

An object recognition rate improvement apparatus according to the present disclosure may include, in a physical or logical form, a classification module 820, a labeling data collection module 840, a learning model 850, and a prediction model 860 shown in FIG. 8. As illustrated in FIG. 8, the learning model 850 may refer to a model that is trained through input data, the prediction model 860 may refer to a predictive model that may be completely trained and thus may output result data accordingly when test data is input, and the learning model 850 may be a model whose recognition rate is improved through training, and as a result, may refer to the first model 620 installed in the autonomous vehicle.

In general, labeling of data, which is a process needed when preprocessing raw data to perform machine learning, may be performed by a human because features of the data are not accurately classified, but the object recognition rate improvement apparatus according to the present disclosure may induce the learning model 850 to quickly and efficiently learn features of raw data 810 by performing active labeling using active learning including a portion of auto-labeling.

Like the illustration in FIG. 6, in FIG. 8, the raw data 810 may refer to an image captured and collected by a camera while the autonomous vehicle travels.

The raw data 810 may be automatically labeled by the classification module 820. In detail, when the raw data 810 is an image including a plurality of frames, the classification module 820 may automatically recognize objects in each frame and may automatically classify classes of the objects by classifying, in a particular frame, an object a into a truck, an object b into a pedestrian, an object c into a two-wheeler, and the like.

While analyzing the raw data 810, the classification module 820 may not automatically perform labeling on an object determined not to be easily classified through an internal classification algorithm. Here, the object, which is determined not to be easily classified may be a weakness points as described with reference to FIGS. 6 to 7C. In other words, the first object 710*a* and the fifth object 750*a* of FIG. 7A, which are determined to be differences between the results of the first model 620 and the second model 630 even after being filtered by the filter criterion, may be objects that are determined not to be easily classified by the classification module 820. Information regarding the objects, which are determined not to be easily classified, may be automatically collected by the classification module 820 and delivered to a user 830 who acquires a high-level classification criterion, and after completing labeling on the data, the user 830 may transmit labeling data 835 to the labeling data collection module 840.

The labeling data collection module 840 may receive both automatically labeled data from the classification module 820 and manually labeled data from the user 830 and may control the learning model 850 to learn the labeled data. A process may be repeated in which data that is not learned by the learning model 850 due to irregularity, may be retransmitted to the classification module 820, labeled by the classification module 820 or the user 830, and re-input into the learning model 850, and finally, a model, which completes learning about object recognition of the raw data 810, may become the prediction model 860 and may accurately recognize objects included in newly input raw data 810.

As described above, only some selected data may be labeled to the user 830 who acquires the high-level classification criterion, and active learning, which automatically performs labeling, may be applied to the remaining data. Therefore, the learning model 850 according to the present disclosure may quickly and accurately learn training data (information regarding an object in an image), and when the filtering criterion described with reference to FIGS. 7A to 7C is applied to the classification module 820, an amount of labeling work that needs to be manually performed by the user 830 may be significantly reduced. In other words, according to the present disclosure, excessive costs (e.g., a time cost, a financial cost, and the like) occurring due to existing labeling work may be reduced to be smallest.

Figure 9:
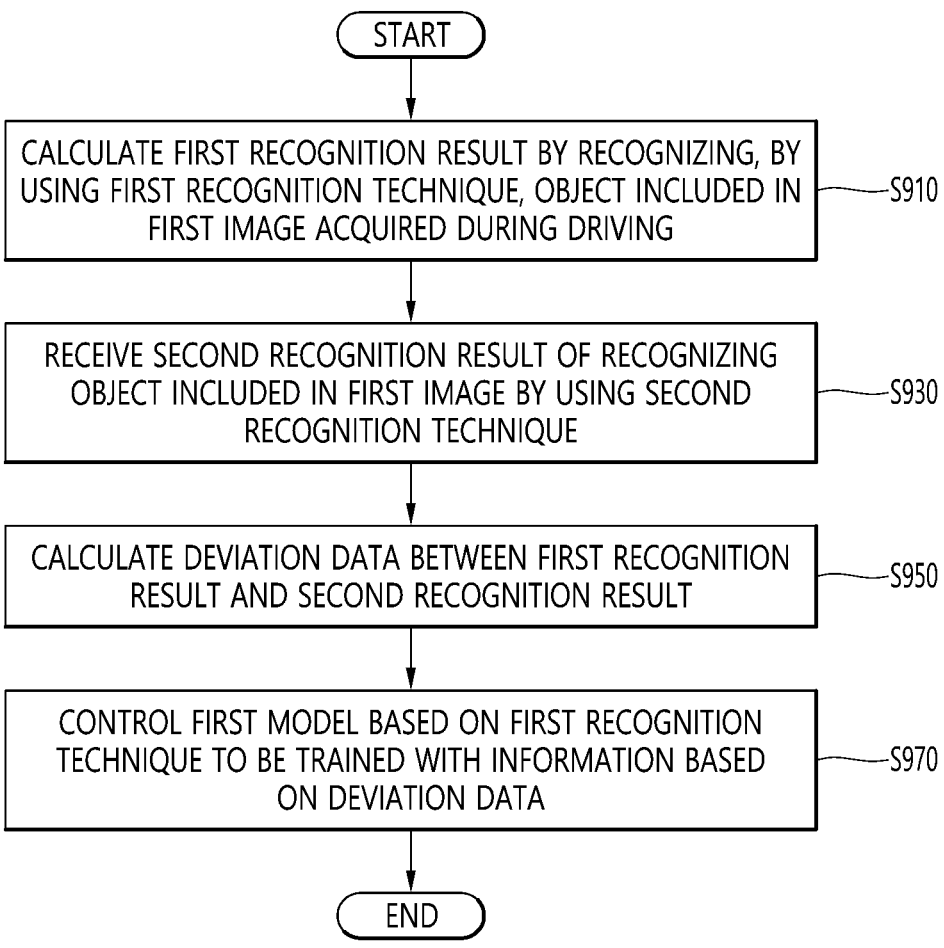
FIG. 9 is a flowchart illustrating an example of an object recognition rate improvement method, according to the present disclosure.

FIG. 9 is a flowchart illustrating an example of an object recognition rate improvement method according to the present disclosure.

The method according to FIG. 9 may be implemented by the object recognition rate improvement apparatus described above and thus is described below with reference to FIGS. 6 to 8, and the same description as the descriptions with reference to FIGS. 6 to 8 are omitted.

In operation S910, the object recognition rate improvement apparatus may recognize, by using a first recognition technique, an object included in a first image acquired during driving and calculate a first recognition result.

In operation S930, the object recognition rate improvement apparatus may receive a second recognition result of recognizing the object included in the first image by using a second recognition technique.

In operation S950, the object recognition rate improvement apparatus may calculate deviation data between the first recognition result and the second recognition result.

In operation S970, the object recognition rate improvement apparatus may control a first model, which recognizes an object included in an image by using the first recognition technique, to be trained by using information based on the deviation data calculated in operation S950.

Figure 10:
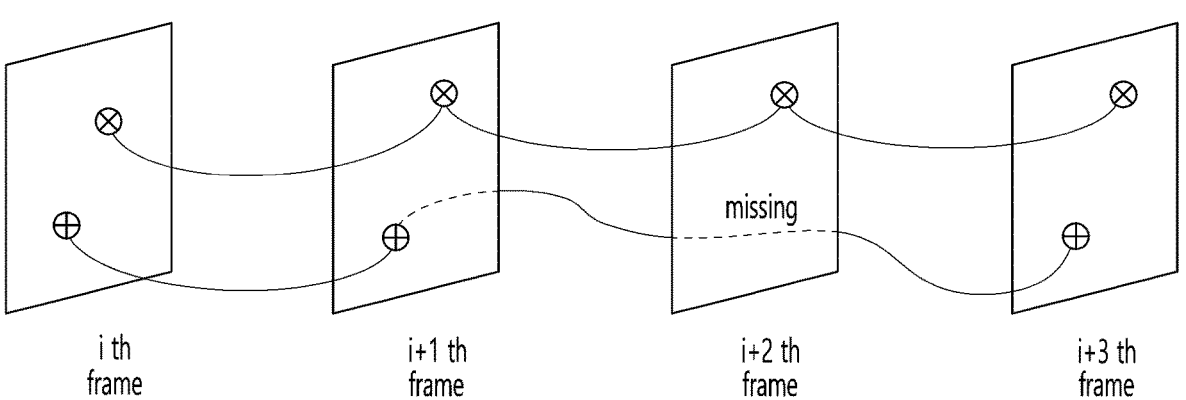
FIG. 10 is a view illustrating an object recognition rate improvement method according to an embodiment.

FIG. 10 is a view illustrating an object recognition rate improvement method according to an embodiment.

The present selective embodiment may share some of the same processes as the object recognition rate improvement method described with reference to FIGS. 6 to 9. A component for recognizing an object by analyzing an image acquired during driving may be equally configured, but unlike the method of FIG. 6 in which the object is recognized and the deviation data is calculated by applying different recognition techniques to the same image, in the present embodiment, objects included in an image may be recognized through one recognition technique. In the present embodiment, a model recognizing an object in an image may be referred to as a recognition model to be distinguished from the first model 620 and the second model 630 described above.

FIG. 10 illustrates a total of four frames, and at least one object may be located at a particular location in each of the frames. In more detail, as illustrated in FIG. 10, objects may be recognized as being present at an upper end and a lower end of each of an $i^{th}$ frame, an $i^{th}+1$ frame, and an $i^{th}+3$ frame, but in an $i^{th}+2$ frame, an object at a lower end may temporarily disappear and thus an object may be recognized as being present only at an upper end. As shown in FIG. 10, an object recognition rate improvement apparatus according to the present embodiment may consider, as a weakness point, a case where an object suddenly disappears in a particular frame while tracking a particular object and then an object is recognized within a short time and may convert the weakness point into training data for training a recognition model.

In other words, the present embodiment may be understood as an embodiment in which when a normally tracked object disappears and then reappears in a particular frame, a performance limit of an object recognition module of an autonomous vehicle may occur, and the object recognition performance may be improved through additional training for the object recognition module.

TABLE 4

| | Embodiment Described with reference to FIG. 6 | Embodiment Described with reference to FIG. 10 |
|---|---|---|
| Basic Process | Identify weakness point of recognition model installed in | Recognition model, which recognizes object in image by |

TABLE 4-continued

| | Embodiment Described with reference to FIG. 6 | Embodiment Described with reference to FIG. 10 |
|---|---|---|
| | autonomous vehicle by using result data of two models that recognize object in image by using different recognition techniques | using predetermined recognition technique, identifies weakness point of recognition model installed in autonomous vehicle, on basis that object being tracked disappears temporarily and then quickly reappears |
| Difference Summarization | 1)Need both first model and second model 2)Compare in each frame | 1)Need only first model 2)Compare whether or not objects are present in consecutive frames of one image |

Table 4 is a table showing differences between the embodiment described with reference to FIGS. 6 to 9 and the embodiment described with reference to FIG. 10. Referring to Table 4, two embodiments have the same aims in terms of identifying a point at the performance limit (e.g., a weakness point) of the object recognition module mounted on the autonomous vehicle occurs and generating training data for complementing the identified performance limit to quickly and efficiently train the object recognition module (i.e., a recognition model), but may have some differences in components for implementing the same.

Figure 11:
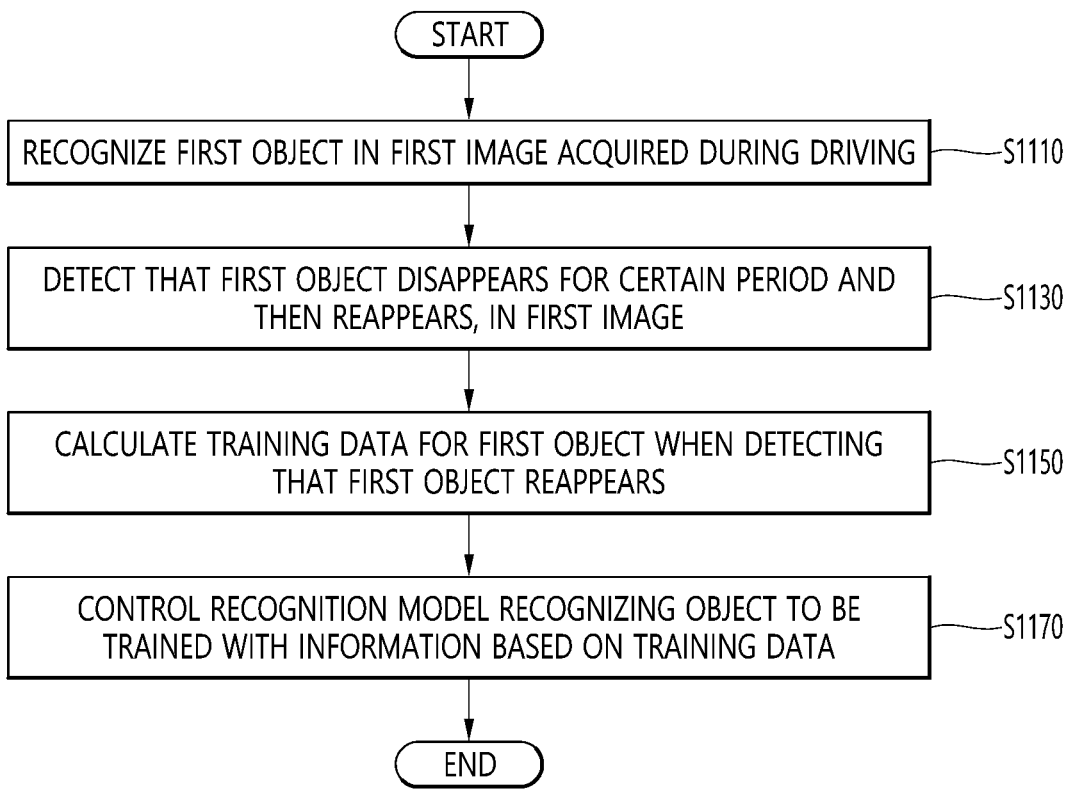
FIG. 11 is a flowchart illustrating an object recognition rate improvement method according to the embodiment described with reference to FIG. 10.

FIG. 11 is a flowchart illustrating an object recognition rate improvement method according to the embodiment described with reference to FIG. 10.

In operation S1110, an object recognition rate improvement apparatus may recognize a first object in a first image acquired during driving. Here, the object recognition rate improvement apparatus recognizing the first object in the first image may indicate that, as shown in FIG. 10, the object recognition rate improvement apparatus recognizes the first object in a frame constituting the first image and identifies information regarding a size and type (class) of the first object.

In operation S1130, the object recognition rate improvement apparatus may detect whether or not the first object disappears for a certain period and then reappears, in the first image.

Here, the certain period may be a time range value for at least one frame. When a frame rate of the collected first image is 30 frames/seconds, the certain period may be a time range value from 0 second to 1/30 second.

As another example, the certain period may be a time range value for one frame to three frames, and in FIG. 10, the certain period may be a time range value for one frame. When the certain period is a time range value for three frames and the first object tracked in an $i^{th}$ frame disappears in an $i^{th}+1$ frame and then reappears in an $i^{th}+5$ frame, the first object may be considered to disappear for the certain period.

In operation S1150, the object recognition rate improvement apparatus may calculate training data for the first object, on the basis of detecting that the first object reappears. In the case where the first object does not reappear after disappearing or reappears after a certain period elapses, the object recognition rate improvement apparatus may consider a condition as not being satisfied and may not calculate the training data for the first object. In particular, in the case where the first object disappears and then reappears after a time longer than the certain period elapses, a recognition model is highly likely not to recognize the first object because the first object is shielded by another object, rather than failing to recognize the first object due to a limitation on recognition performance, and thus, a condition for calculating the training data may not be considered to be satisfied.

In operation S1150, the training data may include at least one of information regarding a size, location, and classification code (class) of the first object and a history of the first object that disappears for the certain period and then reappears, after being initially recognized, and information regarding confidence of the first object.

In operation S1170, the object recognition rate improvement apparatus may control the recognition model of an autonomous vehicle, which recognizes an object in an image acquired during driving, to be trained with information based on the training data calculated in operation S1150.

In operation S1170, the information based on the training data may refer to information that is further processed at least once so that the training data calculated in operation S1150 may be input into the recognition model. As an example, the information based on the training data may be information obtained by filtering the training data on the basis of a preset filter criterion.

As a selective embodiment, the preset filter criterion may be a filter criterion for a time length of a series of frames when the first object is recognized in a first frame, disappears in a second frame, and the reappears in a third frame, and the object recognition rate improvement apparatus may allow the information based on the training data to be calculated through the filter criterion only in the case where a time length between the first frame and the third frame is longer than a length of 10 frames. The present filter criterion may indicate that only an object that is tracked long enough through several frames may be selectively learned.

As another selective embodiment, the preset filter criterion may be a classification criterion for classifying the type of first object that is recognized in the first frame, disappears for the certain period in the second frame, and then reappears in the third frame, and the object recognition rate improvement apparatus may allow the information based on the training data to be calculated through the classification criterion only in the case where the class of the first object is a car, truck, bus, or miscellaneous (misc.). The present filter criterion may indicate that learning may be focused on a car, truck, bus, or miscellaneous that is an object having high significance in autonomous driving.

As another selective embodiment, the preset filter criterion may be a size criterion for distinguishing the size of the first object that is recognized in the first frame, disappears for the certain in the second frame, and then reappears in the third frame, and the object recognition rate improvement apparatus may allow the information based on the training data to be calculated through the size criterion when a height or width of the first object exceeds a preset pixel. The present filter criterion may indicate that the recognition model may be trained only for the first object of a sufficiently great size.

As compared and described in Table 4, when an object disappears and then reappears, the recognition model may not recognize the object in a period in which the object disappears even though the object does not completely disappear, due to the limited performance of the recognition model, and thus, the same may be classified as the weakness point of the recognition model described with reference to FIG. 8, and active learning may be applied in the same method.

In other words, when the type of object included in the training data is accurately labeled through an input from a user who is familiar with the object classification criterion, the labeled data may be input as the information based on the training data into the recognition model through a labeling data collection module. When the recognition model that is completely trained through repeated training receives a second image as new test data, the recognition model may accurately recognize a second object in the second image without missing frames.

Figure 12:
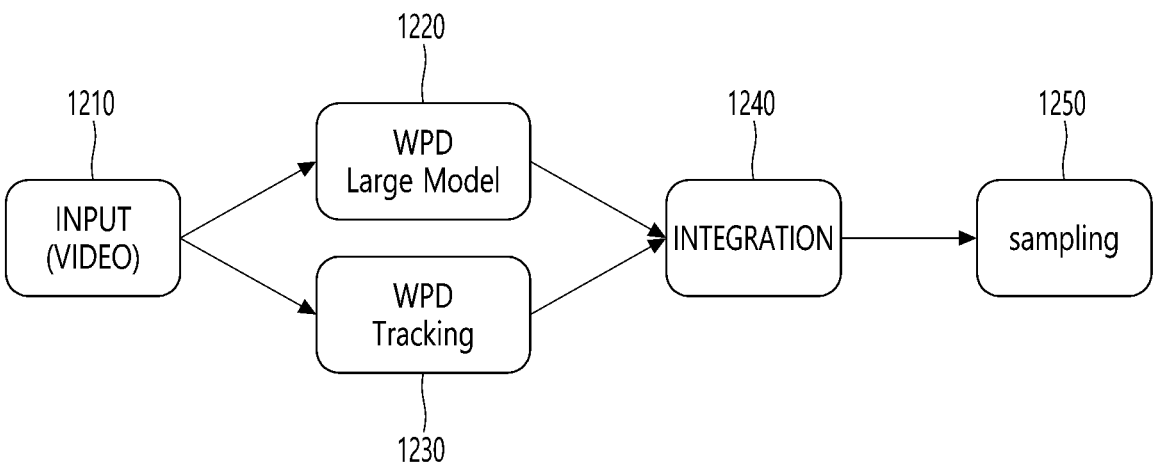
FIG. 12 is a conceptual view conceptually illustrating an example of a method of generating an improved training data video, according to the present disclosure.

FIG. 12 is a conceptual view conceptually illustrating an example of a method of generating an improved training data video, according to the present disclosure.

In more detail, FIG. 12 conceptually illustrates respective operations of the method of generating the improved training data video according to the present disclosure by dividing the operations by subject, and intuitively illustrates an operation of acquiring an image, an operation of recognizing an object and detecting some frames, in the image, an operation of integrating the detected frames, and an operation of performing sampling on the integrated frames. Hereinafter, processes performed in the respective operations are described in detail.

In operation 1210, an image acquired during driving of an autonomous vehicle may be collected through a camera mounted on the autonomous vehicle. The images collected in operation 1210 may be a video including a plurality of frames having a constant frame rate. The image captured and generated by the camera mounted on the autonomous vehicle may be transmitted through wired or wireless communication to an apparatus for generating an improved training data video according to the present disclosure. The image acquired during driving of the autonomous vehicle may be referred to as a first image for convenience.

In the present disclosure, a training data video may be a video for training a recognition model that may recognize an object in an image by analyzing the image, when the recognition model is trained with a high-quality training data video, the recognition model may further accurately recognize the object included in the image, and when the recognition model is trained with a low-quality training data video, a recognition rate of the recognition model for the object included in the image may be lowered. In other words, the method of generating the improved training data video, according to the present disclosure, may provide a methodology capable of generating a relatively higher quality training data video compared to previously known training data.

In operation 1220, the object included in the first image may be recognized by applying a weakness point detection (WPD) large model to the collected first image, particular frames in which the object is recognized may be detected. Here, the WPD large model may be a model included in an apparatus capable of recognizing objects (e.g., a bus, a car, a truck, a pedestrian, a two-wheeler, and the like) included in an image through a unique recognition technique, distinguishably processing cases where the objects include an object that needs to be recognized but is not recognized or an object that does not need to be recognized but is recognized as an object, and accordingly, generating training data for improving a recognition rate for an object in an image. For example, the WPD large model of FIG. 12 may be a concept including the first model 620, the second model 630, the deviation data calculation module 640, and the weakness point analysis module 650 in FIG. 6.

In operation 1230, WPD tracking may be applied to the collected first image to recognize the object included in the first image and detect particular frames related to the object. Here, like the WPD large model described above, the WPD tracking may be a model that recognizes an object included in an image through a unique recognition technique and analyzes the recognized result to detect a particular frame. For example, the WPD tracking of FIG. 12 may be a model that implements the tracking algorithm described with reference to FIGS. 10 and 11. In other words, when the object for which tracking starts disappears temporarily (for a few frames) and then reappears while a particular object is recognized in the first image and thus tracking starts, the WPD tracking of FIG. 12 may particularize the numbers of frames which are not tracked, calculate the numbers as result values, and sum the corresponding frames to generate a training data video for improving an object recognition of a recognition model.

Hereinafter, the recognition technique may be considered to refer to an algorithm that may recognize, in the first image, objects (e.g., a car, a truck, a bus, a two-wheeler, a pedestrian, and the like) on a road, which may affect autonomous driving of the autonomous vehicle, and a detection technique may be considered to refer to an algorithm that detects particular frames from among a plurality of frames constituting an image, on the basis of the result of analyzing the result of recognition when the object in the image is recognized through the recognition technique. For example, the first model 620 and the second model 630 of FIG. 6 may be an example of a recognition model that performs a recognition technique, and the WPD large model and the WPD tracking of FIG. 12 may be an example of a model that performs a detection technique.

In operation 1240, a process of collecting and integrating frames particularized as a result of processing by the WPD large model or the WPD tracking may be performed. Although training data for improving an object recognition rate may be collected even through the detection technique performed in operations 1220 and 1230, the detection technique based on the WPD large model may have a limitation in that portions that are not all recognized as objects by two recognition models used are not continuously recognized, and the detection technique based on the WPD tracking may have a limitation in that tracking is completely excluded for a portion that is not initially recognized as an object. Therefore, the present disclosure provides a method of overcoming the above technical limitations by integrating result data from different detection techniques.

For example, when the numbers of frames in the first image detected by the WPD large model are 1, 5, 14, 16, 32, 50, and the numbers of frames in the first image detected by the WPD tracking are 14 and 52, in operation 1240, the numbers of integrated frames may be 1, 5, 14, 16, 32, 50, and 52, and hereinafter, the integrated frames may be collectively referred to as a frame set.

In operation 1250, a sampling process may be performed on the integrated frames. In operation 1250, sampling may be performed by collectively considering that frames are selected in the same image by using different detection techniques, and thus, consecutive frames include very similar information and that when the number of frames detected in operations 1220 and 1230 is excessively great, a training data video acquired may include a lot of unneeded information, and thus, overfitting for an object recognition rate may occur.

In the present disclosure, the method of sampling a plurality of integrated frames may include various methods. For example, the method may include a method of randomly performing sampling, at regular time intervals, in frames included in each time interval. When the frame rate is constant and the numbers of integrated frames are 1, 5, 14, 16, 32, and 50, and sampling may be performed every 10 frames, and thus, as the sampled result, any one frame from among the number 1 frame and the number 5 frame and any one frame between the number 14 frame and the number 16 frame may be sampled together with the number 32 frame and the number 50 frame, and thus, a total of four frames may be sampled. The apparatus according to the present disclosure may generate an improved training data video by combining four sampled frames in time series order, the training data video, which is generated by the apparatus according to the present disclosure through a series of processes with respect to the first image, may be referred to as a second image, and hereinafter, the apparatus according to the present disclosure may be referred to as a second image generating apparatus. Also, the second image generating apparatus may be implemented in a form that physically or logically includes the object recognition rate improvement apparatus described with reference to FIGS. 5 to 11.

As an embodiment, in operation 1250, a frame group may be used to perform sampling on frames included in the frame set. In more detail, the second image generating apparatus may generate, on the basis of the frame set generated in operation 1240, the frame group including at least one frame and including frames that do not overlap each other, extract frames in each frame group, generate a second image by combining the extracted frames.

TABLE 5

| First Detection Technique | 1, 5, 14, 16, 32, 51 |
|---|---|
| Second Detection Technique | 14, 53 |
| Frame Set | 1, 5, 14, 16, 32, 51, 53 |
| Frame Group | {1, 5}, {14, 16}, {36}, {51, 53} |
| Extracted Frame | 1, 14, 36, 51 |

Table 5 is a table illustrating an embodiment of generating a second image by generating a frame group from a frame set. In Table 5, the numbers of frames detected by a first detection technique are 1, 5, 14, 16, 32, and 51, where the first detection technique may be a detection technique based on the WPD large model of FIG. 12, but is not limited thereto. Also, in Table 5, the numbers of frames detected by a second detection technique are 14 and 53, where the second detection technique may be a detection technique based on the WPD tracking of FIG. 12, but is not limited thereto. As described above, the first detection technique and the second detection technique may be detection techniques that detect frames by using different algorithms. When the detected frames are integrated in operation 1240 of FIG. 12, the numbers of frames included in the frame set in Table 5 may be 1, 5, 14, 16, 32, 51, and 53, and in the present embodiment, the second image generating apparatus may generate a total of 4 frame groups by sampling the frames included in the frame set into units of ten frames. In the present embodiment, when four frame groups are generated as shown in Table 5, the second image generating apparatus may generate a second image by extracting frames in each frame group.

According to embodiments, the second image generating apparatus may generate the second image by extracting one frame in each frame group, and may generate the second image by extracting several frames according to a weight set for each frame group or a weight set for each frame belonging to the frame group.

As an example, the weight set for each frame group may be a value determined on the basis of the number of frames included in each frame group. When a frame group A includes ten frames and a frame group B includes five frames, the second image generating apparatus may perform sampling in a method of selecting two frames in the frame group A and selecting one frame in the frame group B on the basis that a ratio between weights of the frame groups A and B is 2:1.

Figure 13:
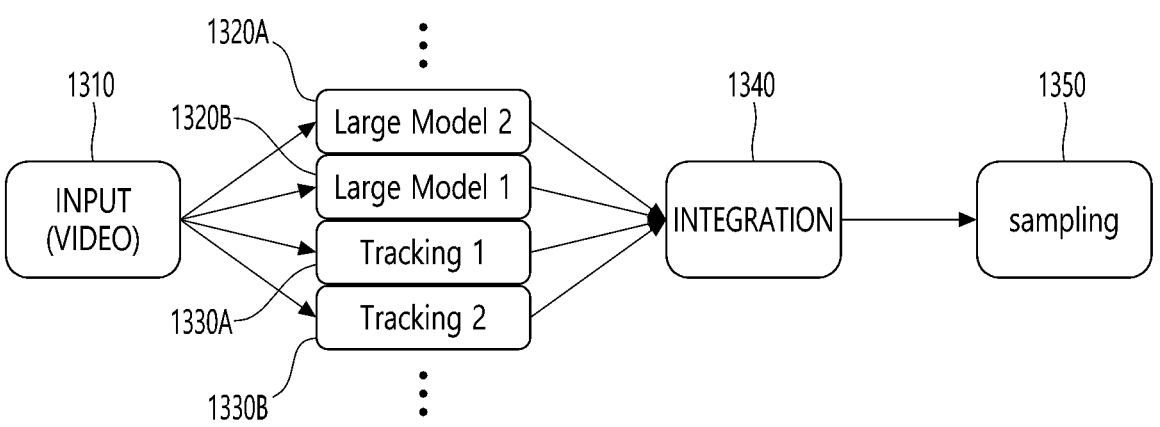
FIG. 13 is a view schematically illustrating an expanded concept of the embodiment described with reference to FIG. 12.

As another example, the second image generating apparatus may extract a frame in each frame group by considering a weight set for a particular frame belonging to a frame group. In Table 5, the number of frame detected by both the first detection technique and the second detection technique may be 14, and the number 14 frame in the first image may have a higher weight than other frames. In other words, a weight may be set as metadata for each frame, and a higher weight may be set for a frame that is repeatedly detected by several detection techniques. In particular, FIG. 12 and Table 5 illustrate a total of two detection techniques, but in the case where the number of detection techniques increases to three or more as shown in FIG. 13, weights of various sizes may be set for frames included in the frame set, respectively. The second image generating apparatus may essentially select frames having high weights while sampling frames in several frame groups, and as a result, the second image may include the frames having the high weights.

As another embodiment, a weight set for a particular frame belonging to a frame group may be a value that depends on a weight set individually for each detection technique. For example, when the first detection technique, the second detection technique, and a third detection technique are present and a weight of the first detection technique is 1, a weight of the second detection technique is 2, and a weight of the third detection technique is 3, a weight of a frame repeatedly detected by the first detection technique and the second detection technique may be lower than a weight of a frame repeatedly detected by the first detection technique and the third detection technique, and the weight of the frame repeatedly detected by the first detection technique and the third detection technique may be lower than a weight of a frame repeatedly detected by the second detection technique and the third detection technique. Therefore, in the present disclosure, frames included in a frame set may have, as metadata, information that is a weight finally determined by a value set for each detection technique by which each frame is detected, as well as for a frame group to which respective frames belong, and the weight may be a factor that effectively acts in a sampling process performed by the second image generating apparatus.

FIG. 13 is a view schematically illustrating an expanded concept of the embodiment described with reference to FIG. 12.

When comparing FIG. 13 with FIG. 12, operation 1310 in which a first image acquired during driving is input to be input data of a second image generating apparatus, operation 1340 in which frames detected according to a plurality of detection techniques are integrated into a frame set, and operation 1350 in which the frames are integrated and then sampled are common, and processes 1320A and 1330B for detecting frames in which an object is recognized may be differentiated.

In particular, FIG. 12 illustrates that two subjects (i.e., the WPD large model and the WPD tracking) perform a detection technique to detect frames that are the basis of the second image, but FIG. 13 illustrates four or more subjects.

In FIG. 13, a large model 1 and a large model 2 may be unique recognition techniques, respectively, and may refer to recognition models for a WPD large model that processes recognition techniques that recognize an object included in a first image, as described above, and combinations of the recognition techniques used may have different features according to identification numbers. For example, the large model 1 may be a detection technique that detects a frame by using an algorithm for recognizing an object in a first image on the basis of Yo10V4-CSP described with reference to Table 2 and an algorithm for recognizing an object in a first image on the basis of Yo10V4-P7 described with reference to Table 3, and the large model 2 may be a detection technique that detects a frame by using an algorithm that recognizes an object in a first image on the basis of the YoloV4-P5 and an algorithm that recognizes an object in a first image on the basis of YoloV4-P6 described with reference to Table 3.

Also, tracking 1 and tracking 2 in FIG. 13 may refer to different versions of WPD tracking algorithm described with reference to FIGS. 10 and 11. In particular, the WPD tracking may include various versions according to a time criterion by which a once-recognized object disappears for a certain period and then reappears. For example, in FIG. 13, the tracking 1 may be a detection technique that detects a frame by regarding, as a weakness point, a case where once-recognized object disappears for three frames and then reappears, and the tracking 2 may be a detection technique that detects a frame in the case where once-recognized object disappears for two frames and then reappears.

FIG. 13 illustrates only WPD large model and tracking algorithms, but according to embodiments, various object recognition algorithms such as simple online and realtime tracking (SORT), bytetrack, and StrongSORT may be further added.

In other words, in FIG. 13, the number of techniques for recognizing an object in a first image and detecting a frame for the recognized object in various methods is not limited according to a basic detection algorithm, training data, and the like used by each detection technique, and thus, FIG. 13 illustrates a total of four detection techniques, but according to embodiments, fewer or more detection techniques than four may be used. Also, even when the number of detection techniques is four or more as described with reference to FIG. 12, all of various embodiments described with reference to FIG. 12 may be applied herein.

Figure 14:
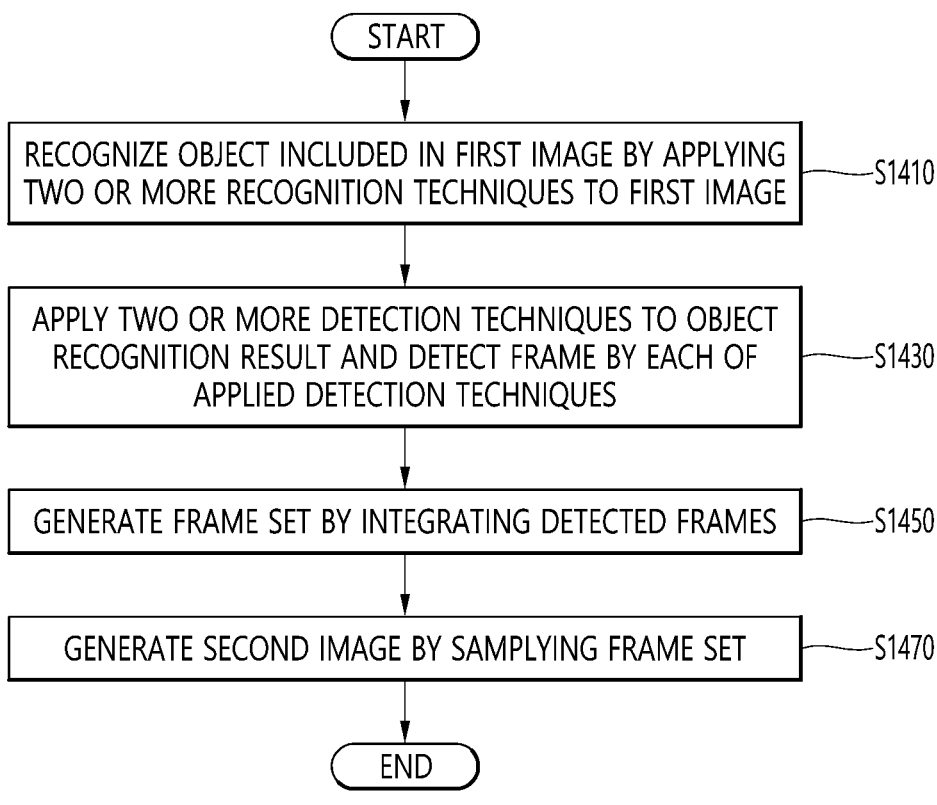
FIG. 14 is a flowchart illustrating an example of a method of generating a second image, according to the present disclosure.

FIG. 14 is a flowchart illustrating an example of a method of generating a second image, according to the present disclosure.

The method according to FIG. 14 may be implemented by the second image generating apparatus described with reference to FIGS. 12 and 13 and is described below with reference to FIGS. 12 and 13, and the same description as the above descriptions is omitted.

In operation S1410, the second image generating apparatus may recognize an object included in a first image by applying at least two recognition techniques to the first image acquired during driving.

In operation S1430, the second image generating apparatus may apply at least two detection techniques to the result of recognizing the object in operation S1410 and detect a frame by each detection technique.

In operation S1450, the second image generating apparatus may generate a frame set including a plurality of frames by integrating the frames detected in operation S1430.

In operation S1470, the second image generating apparatus may generate a second image by sampling the integrated frame set.

The second image generated in operation S1470 may be high-quality training data that is more helpful in improving an object recognition rate through a method of diversifying detection techniques and sampling according to unique features, when compared to training data generated by an existing method.

Figure 15:
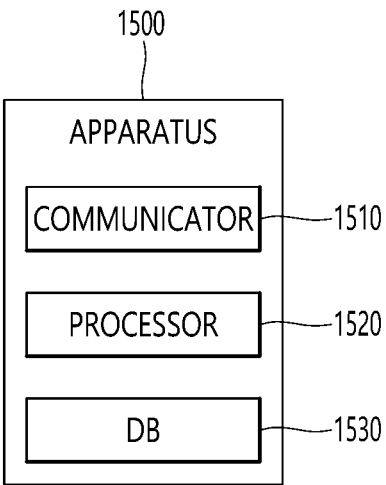
FIG. 15 is a block diagram of an apparatus for generating a second video, according to an embodiment.

FIG. 15 is a block diagram of a second image generating apparatus according to an embodiment.

Referring to FIG. 15, a second image generating apparatus 1500 may include a communicator 1510, a processor 1520, and a DB 1530. Only components related to the embodiment are illustrated in the second image generating apparatus 1500 of FIG. 15. Accordingly, one of ordinary skill in the art may understand that other general-purpose components may be further included in addition to the components shown in FIG. 15.

The communicator 1510 may include one or more components that enable wired/wireless communication with an external server or external device. For example, the communicator 1510 may include at least one of a short-range communication unit (not shown), a mobile communication unit (not shown), and a broadcast receiver (not shown).

The DB 1530 may be hardware that stores various types of data processed within the second image generating apparatus 1500, and may store a program for processing and control by the processor 1520.

The DB 1530 may include random access memory (RAM) such as dynamic random access memory (DRAM) or static random access memory (SRAM), read-only memory (ROM), electrically erasable programmable read-only memory (EEPROM), CD-ROM, Blu-ray or other optical disk storages, a hard disk drive (HDD), a solid state drive (SSD), or flash memory.

The processor 1520 may control an overall operation of the second image generating apparatus 1500. For example, the processor 1520 may generally control an input unit (not shown), a display (not shown), the communicator 1510, the DB 1530, and the like by executing programs stored in the DB 1530. The processor 1520 may control the operation of the second image generating apparatus 1500 by executing the programs stored in the DB 1530.

The processor 1520 may control at least some of operations of the second image generating apparatus 1500, which are described above with reference to FIGS. 12 to 14.

As an example, as described with reference to FIGS. 6 to 9, the processor 1520 may recognize, by using a first recognition technique, an object included in a first image acquired while a vehicle travels to calculate a first recognition result, receive a second recognition result of recognizing the object included in the first image by using a second recognition technique, calculate deviation data between the first recognition result and the second recognition result, and control a first model operating according to the first recognition method to be trained with information based on the calculated deviation data.

As another example, as described with reference to FIGS. 10 and 11, the processor 1520 may recognize a first object in the first image acquired during driving, detect that the first object disappears for a certain period and then reappears, in the first image, when detecting that the first object reappears, calculate training data for the first object, and control a recognition model recognizing an object included in an image to be trained with information based on the calculated training data.

As another example, the processor 1520 may recognize an object included in the first image by applying at least two recognition techniques to the first image acquired during driving, apply at least two detection techniques to the result of recognizing the object, detect a frame by each detection technique, generate a frame set including a plurality of frames by integrating detected frames, and generate a second image by sampling the integrated frame set.

The processor 1520 may be implemented by using at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and other electrical units for performing functions.

Figure 16:
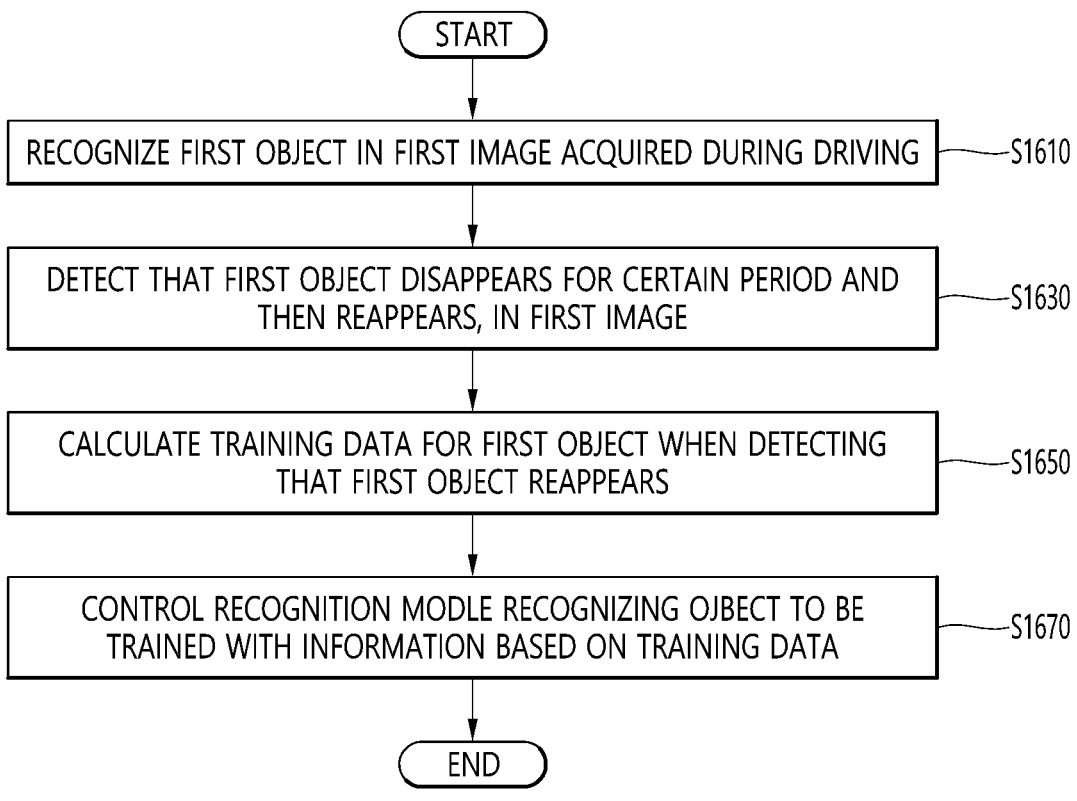
FIG. 16 is a flowchart illustrating an object recognition rate improvement method according to the embodiment described with reference to FIG. 10.

FIG. 16 is a flowchart illustrating an object recognition rate improvement method according to the embodiment described with reference to FIG. 10.

In operation S1610, an object recognition rate improvement apparatus may recognize a first object in a first image acquired during driving. Here, as shown in FIG. 10, the object recognition rate improvement apparatus recognizing the first object in the first image may indicate that the object recognition rate improvement apparatus identifies information regarding a size and type (class) of the first object by recognizing the first object in frames constituting the first image.

In operation S1630, the object recognition rate improvement apparatus may detect whether or not the first object disappears for a certain period and then reappears, in the first image (a first frame).

Here, the certain period may be a time range value for at least one frame. When a frame rate of the collected first image is 30 frames/seconds, the certain period may be a time range value from 0 second to 1/30 second.

As another example, the certain period may be a time range value for one frame to three frames, and in FIG. 10, the certain period may be a time range value for one frame. When the certain period is a time range value for three frames and a first object tracked in an $i^{th}$ frame disappears in an $i^{th}$+1 frame and then reappears in an $i^{th}$+5 frame, the first frame may be regarded as disappearing for the certain period.

In operation S1650, the object recognition rate improvement apparatus may calculate training data for the first object, on the basis of detecting that the first object reappears. Also, on the basis of detecting that the first object reappears, the object recognition rate improvement apparatus may determine that the first object is recognized in previous frames in which the first object is determined to disappear for a certain period and thus not be recognized.

For example, in FIG. 10, when the first object is recognized in the $i^{th}$ frame and the $i^{th}$+1 frame, the first object disappears in the $i^{th}$+2 frame, and the first object is recognized again in the $i^{th}$+3 frame, an object recognition apparatus (i.e., an object recognition module) included in the object recognition rate improvement apparatus still may not recognize the first object in the $i^{th}$+2 frame, but the first object, which is recognized in the $i^{th}$ frame, the $i^{th}$+1 frame, and the $i^{th}$+3 frame, may be regarded as being present even in the $i^{th}$+2 frame.

In the case where the first object does not reappear after disappearing or reappears after a certain period elapses, the object recognition rate improvement apparatus may consider a condition as not being satisfied and may not calculate the training data for the first object. In particular, in the case where the first object disappears and then reappears after a longer time than the certain period elapses, a recognition model is highly likely to fail to recognize the first object because the first object is shielded by another object, rather than failing to recognize the first object due to a limitation on recognition performance, and thus, the condition for calculating the training data may be considered to be satisfied.

In operation S1650, the training data may include at least one of information regarding a size, location, and classification code (class) of the first object, and a history of the first object that disappears for a certain period and then reappears after being initially recognized, and information regarding confidence of the first object.

In operation S1670, the object recognition rate improvement apparatus may control the recognition model of an autonomous vehicle, which recognizes an object in an image acquired during, to be trained with information based on the training data calculated in operation S1650.

In operation S1670, the information based on the training data may refer to information that is further processed at least once so that the training data calculated in operation S1650 may be input into the recognition model and, as an example, may information obtained by filtering the training data according to a preset filter criterion.

The tracking algorithm described with reference to FIG. 16 may be implemented as a Kalman filter-based simple online and realtime tracking (SORT) algorithm, but is not limited to thereto. In particular, a tracking algorithm based on a Kalman filter may have a feature of operating normally with respect to a 2D bounding box and may also have a feature of providing result information of performing the tracking algorithm to the 2D bounding box, and the tracking algorithm described in the present disclosure may also have the same features.

As a selective embodiment, the preset filter criterion may be a filter criterion for a time length of a series of frames when the first object is recognized in a first frame, disappears in a second frame, and then reappears in a third frame, and the object recognition rate improvement apparatus may allow the information based on the training data to be calculated through the filter criterion only in the case where a time length between the first frame and the third frame is longer than a length of ten frames. The present filter criterion may indicate that only an object that is tracked long enough in several frames is selectively learned.

As another selective embodiment, the preset filter criterion may be a size criterion for distinguishing the size of the first object that is recognized in the first frame, disappears for a certain period in the second frame, and then reappears in the third frame, and the object recognition rate improvement apparatus may allow the information based on the training data to be calculated through the size criterion when a height or width of the first object exceeds a preset pixel. The present filter criterion may indicate that the recognition model is trained only for the first object of sufficiently great size.

Figure 17:
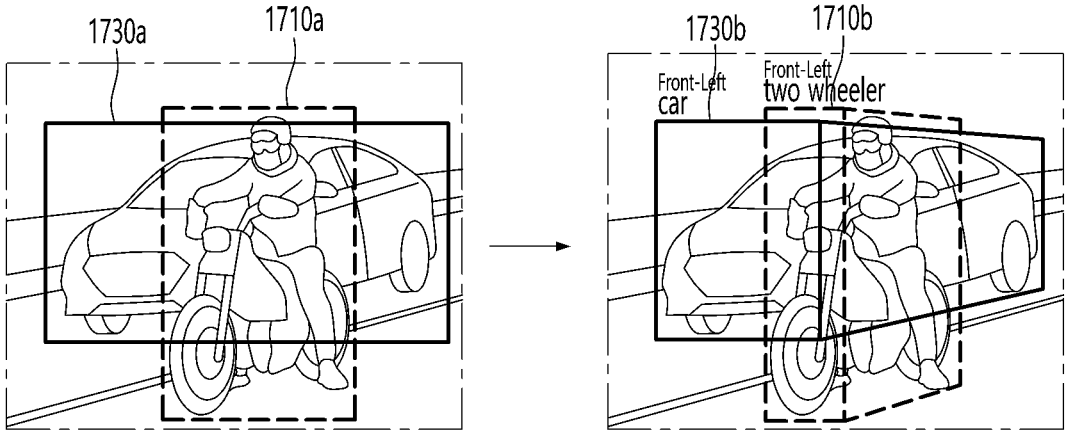
FIG. 17 is a view illustrating a cuboid of an object in an image, according to the present disclosure.

FIG. 17 is a view illustrating a cuboid of an object in an image, according to the present disclosure.

Referring to FIG. 17, an object recognition rate improvement apparatus may recognize two objects in an image and then generate outlines 1710a and 1730a for the respective objects as the results of the recognition, and the object recognition rate improvement apparatus may generate cuboids for the respective objects on the basis of the generated outlines 1710a and 1730a. In other words, the outline 1710a for a motorcycle (e.g., a two-wheeler) may be basic information for generating a cuboid 1710b for the motorcycle, and the outline 1730a for a car may be basic information for generating a cuboid 1730b for the car.

In the present disclosure, a cuboid may be generated by combining two polygons on the basis of a common side, one of the two polygons may represent the front or rear of an object, and the other one may represent a side of the object. According to embodiments, as shown in FIG. 17, a cuboid may be represented as a trapezoid in which the front and rear of an object are represented as rectangles, and lengths of parallel sides of the left and right sides are different from each other.

TABLE 6

| Shape Number | Left Polygon | Right Polygon | Interpretation of Object Movement |
|---|---|---|---|
| First Shape | Rear | Right | Right object gets farther away |
| Second Shape | Left | Rear | Left object gets farther away |
| Third Shape | Front | Left | Left object gets closer |
| Fourth Shape | Right | Front | Right object gets closer |

Table 6 shows an example of an analysis method for object movement in the case where a cuboid has a shape in which two polygons are combined with each other in a horizontal direction on the basis of one common side. As shown in Table 6, the cuboid of the object may be understood as metadata of the object that may intuitively and efficiently represent the overall size and movement direction of the object, and a location of the object relative to a location of a camera capturing an image. As an example, coordinate values of the cuboid may include seven coordinate values. In FIG. 17, the cuboid 1710b of the motorcycle may have a shape in which a rectangle representing the front of the motorcycle and a trapezoid representing the side of the motorcycle are combined with each other on the basis of one common side. Here, vertex coordinates for forming the cuboid 1710b of the motorcycle may include upper left coordinates (x1, y1), upper center coordinates (x2, y1), upper right coordinates (x3, y3), lower left coordinates (x1, y2), lower center coordinates (x2, y2), and lower right coordinates (x3, y4), and coordinate values, which smallest information needed for forming the cuboid 1710b of the motorcycle, may be a total of seven values (x1, x2, x3, y1, y2, y3, y4).

As another example, the cuboid may also include eight coordinate values. Although not shown in FIG. 17, in the case where the object is surrounded by a second outline in a rectangular parallelepiped shape to preserve the perspective of the object, a total of eighth coordinates may be needed to form the cuboid of the object, and a total of eight coordinate values (x1, x2, x3, x4, y1, y2, y3, y4) may be needed.

As shown in FIG. 17, an outline in the form of a 2D bounding box may be generated for an object immediately recognized in an image (or a frame), and a cuboid may be generated on the basis of coordinates of the outline. However, in the case where an object is not recognized in a frame by the tracking algorithm described with reference to FIGS. 10 and 16 but an object is considered to be recognized in the corresponding frame as a result of applying the tracking algorithm, an outline for the object may not still be generated in the corresponding frame. In other words, the object may not be recognized due to a limitation on object recognition performance of the object recognition rate improvement apparatus (e.g., an object recognition apparatus), but a cuboid needs to be acquired for an object in a frame in which an object needs to be recognized originally, and the detailed method thereof is described below with reference to FIGS. 18 and 19.

Figure 18:
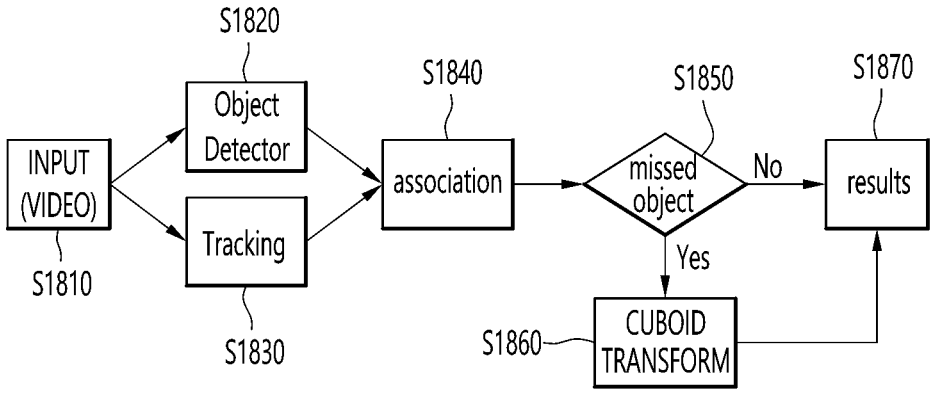
FIG. 18 is a schematic view schematically illustrating a method of acquiring a cuboid of an object in an image, according to the present disclosure.

FIG. 18 is a schematic view schematically illustrating a method of acquiring a cuboid of an object in an image, according to the present disclosure.

Hereinafter, an apparatus for implementing the method of acquiring the cuboid of the object in the image according to the present disclosure may be referred to as a cuboid acquisition apparatus.

In operation S1810, the cuboid acquisition apparatus may receive an image as an input. The image, which is received as an input by the cuboid acquisition apparatus in operation S1810, may include at least two frames and may be an image captured by a camera mounted on a vehicle during driving of the vehicle.

In operation S1820, the cuboid acquisition apparatus may recognize an object by applying an object recognition process to the image received in operation S1810. Here, as described above, the object recognition process may be performed by an object recognition apparatus (an object detector).

In operation S1830, the cuboid acquisition apparatus may apply a tracking algorithm to the image received in operation S1810 to determine whether or not an object needs to be recognized in a frame in which an object is not recognized. Here, the Kalman filter-based SORT algorithm described above may be used as the tracking algorithm, and according to embodiments, an algorithm other than the SORT algorithm may be used.

In operation S1840, the cuboid acquisition apparatus may associate the results of operations S1820 and S1830. The results of the object recognition process and the tracking algorithm may be associated in operation S1840 to determine a case where an object is not detected (the object is recognized) in the object recognition process but the object is detected through the tracking algorithm. In the association process of operation S1840, frames, which are not needed for determining whether or not an object is present, may be excluded in operation S1850 described below.

While associating the results of operations S1820 and S1830, in operation S1850, the cuboid acquisition apparatus may determine the presence or absence of an object, which needs to be recognized immediately through the object recognition process but is not recognized and recognized only through the tracking algorithm. The object determined in operation S1850 may be classified as a missed object, assigned separate metadata, and converted into a cuboid in operation S1860 described below. As an example, a Hungarian algorithm may be applied in operation S1850.

When determining in operation S1850 that the missed object is present, in operation S1860, the cuboid acquisition apparatus may generate cuboid coordinates of the corresponding object. When determining in operation S1850 that the missed object is not present, in operation S1870, a function of the cuboid acquisition apparatus may be terminated without separate conversion into the cuboid.

TABLE 7

|  | First Frame | Second Frame | Note |
|---|---|---|---|
| Object Detector | o | x | Whether or not recognized object is present |
| Tracking | o | Δ | Whether or not recognized and object considered to be recognized are present |
| Outline Generation | o | Δ | Whether or not outline (2D Bbox) is immediately generated |
| Cuboid Generation | o | x | Whether or not cuboid is generated |

Table 7 is a table showing a concept for illustrated in more detail the descriptions of FIG. 18. Hereinafter, for convenience, a first frame and a second frame may refer to one of a plurality of frames included in one image, and the second frame may be considered to be a frame located immediately after the first frame. Table 7 shows the result in which an object is immediately recognized by the object recognition apparatus (the object detector) in the first frame and an object is not recognized by the object recognition apparatus in the second frame.

Table 7 shows the result in which the object is recognized immediately in the first frame and the object is considered to be recognized by a tracking algorithm in the second frame. Comparing the two results described above, as shown in Table 7, the object needs to be recognized in the second frame but is not recognized, and thus may be recognized only through the tracking algorithm. Although not shown in Table 7, a third frame may be located after the second frame, an object may be recognized in the third frame, the tracking algorithm may be applied, and thus, the object may be considered to be recognized in the second frame.

In Table 7, in the first frame in which the object is immediately recognized, an outline and a cuboid surrounding the object may be generated by the cuboid acquisition apparatus according to the present disclosure. When the outline (i.e., a 2D bounding box) surrounding the object is generated, the cuboid acquisition apparatus may use coordinate values of the 2D bounding box to generate a cuboid for each object, as described with reference to Table 6.

Meanwhile, in Table 7, in the second frame in which the object is not recognized immediately and is considered to be recognized, the outline may not be generated immediately, and the cuboid acquisition apparatus may indirectly acquire coordinates the outlie of the object considered to be recognized in the second frame by using coordinate values of outlines generated in frames (e.g., the first frame and the second frame) before and after the second frame.

Finally, as shown in Table 7, the outline is not generated in the second frame, and thus, a cuboid of the object considered to be recognized in the second frame may not be acquired. The present disclosure may provide a method capable of acquiring cuboid coordinates of an object considered to be recognized in a second frame by comprehensively considering an outline of an object recognized in a first frame, an outline of the object considered to be recognized in the second frame, and cuboid coordinates of the object recognized in the first frame, and the description thereof is given below with reference to FIGS. 19 and 20.

Figure 19:
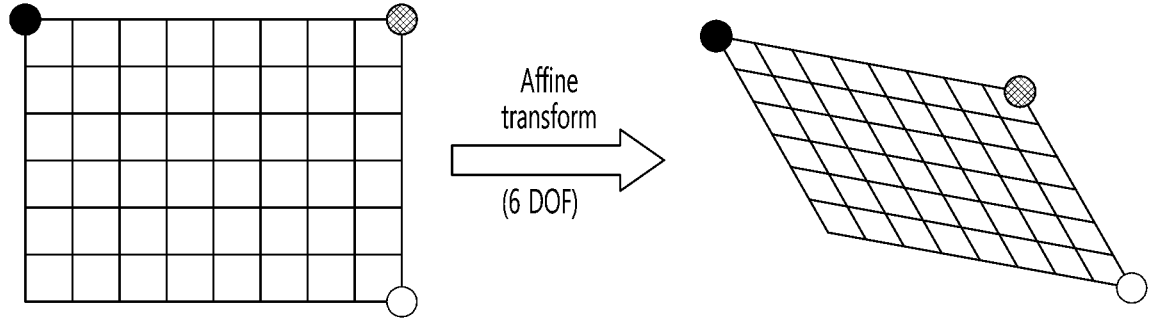
FIG. 19 is a view illustrating a linear mapping method performed by a cuboid acquisition apparatus, according to the present disclosure.

FIG. 19 is a view illustrating a linear mapping method performed by a cuboid acquisition apparatus, according to the present disclosure.

Hereinafter, for convenience of description, the description is given with reference to Table 7, an outline and a cuboid in a first frame may be referred to as a first outline and a first cuboid, and an outline and a cuboid in a second frame may be referred to as a second outline and a second cuboid, respectively.

A cuboid acquisition apparatus according to the present disclosure may calculate a transform value by using coordinate values of the first outline and the second outline that are predetermined. As an example, the transform value may be an affine transform matrix. Referring to FIG. 19, when affine transform is applied to coordinates of three points on the left side of FIG. 19, the coordinates of the three points may be transformed into coordinates of three points on the right side of FIG. 19. The affine transform matrix may be expressed as matrices for translation, scaling, shear, and rotation.

$$\begin{bmatrix} 1 & 0 & 0 \\ 0 & 1 & 0 \\ t_x & t_y & 1 \end{bmatrix}$$ [Equation 1]

Equation 1 represents the matrix for translation in the affine transform. In Equation 1, $t_x$ refers to a value representing displacement in an x-axis direction, and $t_y$ refers to a value representing displacement in a y-axis direction.

$$\begin{bmatrix} s_x & 0 & 0 \\ 0 & s_y & 0 \\ 0 & 0 & 1 \end{bmatrix}$$ [Equation 2]

Equation 2 represents the matrix for scaling in the affine transform. In Equation 2, $s_x$ refers to a value representing a scaling factor on the x-axis, and $s_y$ refers a value representing a scaling factor on the y-axis.

$$\begin{bmatrix} 1 & sh_y & 0 \\ sh_x & 1 & 0 \\ 0 & 0 & 1 \end{bmatrix}$$ [Equation 3]

Equation 3 refers to the matrix for shear in the affine transform. In Equation 3, $sh_x$ refers to a value representing a shear factor on the x-axis, and $sh_y$ refers to a value representing a shear factor on the y-axis.

$$\begin{bmatrix} \cos(q) & \sin(q) & 0 \\ -\sin(q) & \cos(q) & 0 \\ 0 & 0 & 1 \end{bmatrix}$$ [Equation 4]

Equation 4 refers to the matrix for rotation in the affine transform. In Equation 4, q refers to a value representing a rotation angle.

$$T = k_t * t_{affine}$$ [Equation 5]

Equation 5 is an equation for describing the transform value. In Equation 5, T refers to a transform value for a cuboid, $k_t$ refers to a proportional constant, and $t_{affine}$ refers to a transform value for an outline. In Equation 5, $t_{affine}$ may be a value that may be calculated when applying the affine transform as in Equation 1 to Equation 4 on the basis of the coordinates of the first outline and the second outline, and when $t_{affine}$ is applied to coordinate values of the first outline, coordinate values of the second outline may be calculated. In Equation 5, $k_t$ refers to a proportional constant, refers to a constant determined according to a correlation between an outline and a cuboid, and when the proportional constant is 1, a transform value for the cuboid may be equal to a transform value for the outline. In Equation 5, T may be calculated by multiplying the proportional constant $k_t$ by $t_{affine}$, and when T is applied to coordinate values of the first cuboid, coordinate values of the second cuboid, which may not be acquired as shown in Table 7, may be calculated.

The cuboid acquisition apparatus according to the present disclosure may acquire the second cuboid in the second frame according to Equation 1 to Equation 5.

Figure 20:
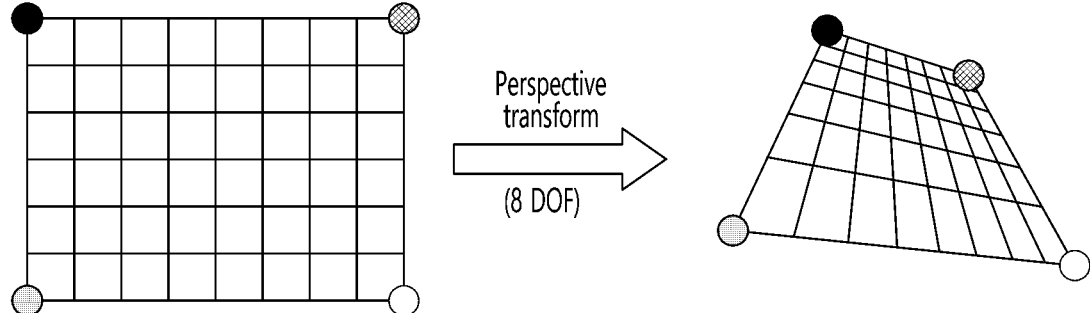
FIG. 20 is a view illustrating another example of a linear mapping method performed by a cuboid acquisition apparatus, according to the present disclosure.

FIG. 20 is a view illustrating another example of a linear mapping method performed by a cuboid acquisition apparatus, according to the present disclosure.

Referring to FIG. 20, when perspective transform is applied to coordinates of four points on the left side of FIG. 20, the coordinates of the four points may be transformed into coordinates of four points on the right side of FIG. 20. Referring to FIGS. 19 and 20, when at least three coordinate values of a first outline and a second outline are given and coordinate values of a first cuboid are given, the cuboid acquisition apparatus according to the present disclosure may acquire coordinate values of a second cuboid.

FIG. 21 is a flowchart illustrating an example of a cuboid acquisition method according to the present disclosure.

The method according to FIG. 21 may be implemented by the cuboid acquisition apparatus described with reference to FIGS. 17 to 20, is described below with reference to FIGS. 17 to 20, and the same description of FIG. 21 as the above descriptions is omitted.

In operation S2110, the cuboid acquisition apparatus may recognize an object in an image and particularize a first frame in which an object is recognized and a second frame in which an object is not recognized.

In operation S2130, the cuboid acquisition apparatus may generate a first outline for the object in the first frame, and acquire coordinates of a first cuboid of the object on the basis of a first coordinate value constituting the first outline.

In operation S2150, the cuboid acquisition apparatus may determine whether or not an object needs to be recognized in the second frame and generate a second outline for the object in the second frame according to the result of the determination. As described with reference to Table 3, in operation S2150, the cuboid acquisition apparatus may determine an object (or an outline of the object) recognized in neighboring frames of the second frame, and herein, the neighboring frames may be frames arranged before and after the second frame, such as the first frame and a second frame. In addition, the number of neighboring frames or numbers of frames may vary according to a time length which is set as a certain period by a tracking algorithm applied in the present disclosure when a once-recognized object disappears for the certain period and then reappears.

In operation S2170, the cuboid acquisition apparatus may calculate a transform value between the first coordinate value of the first outline and a second coordinate value constituting a second outline.

In operation S2190, the cuboid acquisition apparatus may calculate coordinates of a second cuboid of the object in the second frame by applying the transform value to the coordinates of the first cuboid.

Figure 22:
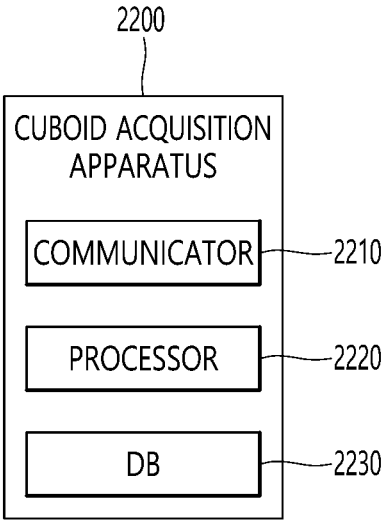
FIG. 22 is a block diagram of a cuboid acquisition apparatus according to an embodiment.

FIG. 22 is a block diagram of a cuboid acquisition apparatus according to an embodiment.

Referring to FIG. 22, a cuboid acquisition apparatus 2200 may include a communicator 2210, a processor 2220, and a DB 2230. FIG. 22 illustrates that the cuboid acquisition apparatus 2200 include only components related to the embodiment. Accordingly, one of ordinary skill in the art may understand that other general-purpose components may be included in addition to the components shown in FIG. 22.

The communicator 2210 may include one or more components that enable wired/wireless communication with an external server or external apparatus. For example, the communicator 2210 may include at least one of a short-range communication unit (not shown), a mobile communication unit (not shown), and a broadcast receiver (not shown).

The DB 2230 may be hardware that stores various types of data processed within the cuboid acquisition apparatus 2200 and may store a program for processing and control by the processor 2220.

The DB 2230 may include a random access memory (RAM) such as dynamic random access memory (DRAM) or static random access memory (SRAM), read-only memory (ROM), electrically erasable programmable read-only memory (EEPROM), CD-ROM, Blu-ray or other optical disk storages, a hard disk drive (HDD), a solid state drive (SSD), or flash memory.

The processor 2220 may control an overall operation of the cuboid acquisition apparatus 2200. For example, the processor 2220 may generally control an input unit (not shown), a display (not shown), the communicator 2210, the DB 2230, and the like by executing programs stored in the DB 2230. The processor 2220 may control the operation of the cuboid acquisition apparatus 2200 by executing the programs stored in the DB 2230.

The processor 2220 may control at least some of the operations of the cuboid acquisition apparatus 2200 described above.

As an example, as described with reference to FIGS. 17 to 21, the processor 2220 may recognize an object in an image, particularize a first frame in which an object is recognized and a second frame in which an object is not recognized, generate a first outline for the object in the first frame, acquire coordinates of a first cuboid of the object on the basis of a first coordinate value constituting the first outline, determine whether or not an object needs to be recognized in the second frame, generate a second outline for the object in the second frame according to the result of the determined, calculate a transform value between the first coordinate value of the first outline and the second coordinate value constituting the second outline, and then apply the transform value to the coordinates of the first cuboid to calculate coordinates of a second cuboid of the object in the second frame.

The processor 2220 may be implemented by using at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and other electrical units for performing functions.

Figure 23:
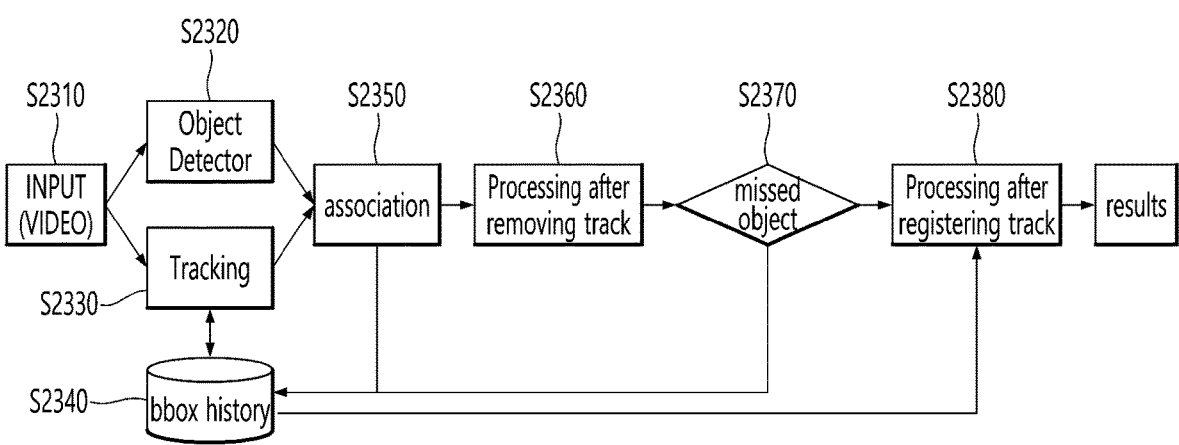
FIG. 23 is a schematic view schematically illustrating an object recognition rate improvement method according to the present disclosure.

FIG. 23 is a schematic view schematically illustrating an object recognition rate improvement method, according to the present disclosure.

Hereinafter, an apparatus for implementing the method according to the present disclosure may be referred to as an object recognition rate improvement apparatus.

In operation S2310, the object recognition rate improvement apparatus may receive an image as an input. The image, which is received as an input by the apparatus in operation S2310, may include at least two frames and may be a video captured by a camera mounted on a vehicle during driving of the vehicle.

In operation S2320, the object recognition rate improvement apparatus may recognize an object by applying an object recognition process to the image received in operation S2310. Here, the object recognition process may be performed by an object recognition apparatus (an object detector) included in the object recognition rate improvement apparatus. The object recognition apparatus may selectively recognize, as an object, only a main object (e.g., a car, a truck, a bus, a two-wheeler, a human, misc, or the like) needed for implementing an autonomous driving function of the vehicle, from among several objects included in a frame of the image, according to an object recognition algorithm set inside. As described with reference to FIGS. 4 and 5, the object recognition algorithm of the object recognition apparatus may be intuitive and convenient in that the object recognition algorithm may immediately recognize some needed objects from among several objects in the image, but due to a limitation on performance of the object recognition algorithm, the object recognition algorithm may fail to recognize an object that needs to be recognized. In the case where the object recognition algorithm fails to recognize the object, which needs to be recognized, due to the limitation on the performance of the object recognition algorithm, the case may be supplemented to a certain extent through the tracking algorithm described in FIGS. 10 and 16.

In operation S2330, the object recognition rate improvement apparatus may determine whether or not an object needs to be recognized in a frame in which an object is not recognized, by applying the tracking algorithm described with reference to FIGS. 10 and 16 to the image received in operation S2310. Here, the Kalman filter-based SORT algorithm described above may be used as the tracking algorithm, and according to embodiments, an algorithm other than SORT algorithm may be used.

While performing the tracking algorithm in operation S2330, in operation S2340, the object recognition rate improvement apparatus may process the result of tracking into history information and store the history information in a history database. The history database may store the result of tracking as well as the results processed in operations S2350, S2370, and S2380, and the description thereof is described below.

In operation S2350, the object recognition rate improvement apparatus may associate the results of operations S2320 and S2330. The results of the object recognition process and the tracking algorithm may be associated in operation S2350 to determine a case where an object is not detected (the object is not recognized) in the object recognition process but the object is detected only through the tracking algorithm. In operation S2350, the object recognition result of operation S2320 may match the tracking result of operation S2330 through a Hungarian algorithm. In detail, in operation S2350, whether or not an outline (e.g., a 2D bounding box) of the object generated for each frame as the object recognition result of operation S2320 matches an outline (e.g., a 2D bounding box) of the object generated for each frame as the tracking result of operation S2330 may be determined, a match flag of the outlines matched for each frame may set to true, and the outlines may be stored as history information in the history database, as shown in FIG. 23. In the association process of operation S2350, frames, which are not needed for determining whether or not the object is present (frames in which outlines of the recognized object are not detected), may be excluded.

When the object recognition rate improvement apparatus fails to detect the object in consecutive frames in time series, in operation S2360, the object recognition rate improvement apparatus may delete a track for the corresponding object (stop tracking) and may refer to the history information stored in the history database. In operation S2360, the object recognition rate improvement apparatus may identify the history information stored in the history database in reverse order, identify a match flag of an outline of the corresponding object, and consecutively delete (exclude), from the entire track, frames for which the match flag is false. Operation S2360 is described with reference to FIG. 25.

In operation S2370, the object recognition rate improvement apparatus may identity whether or not an unmatched outline is present, on the basis of the result of the matching operation in operation S2350. In other words, determining in operation S2370 whether or not the unmatched outline is present may refer to determining in operation S2330 whether or not an outline for the object detected only by the tracking algorithm is present, and when the corresponding outline is present, the object recognition rate improvement apparatus may determine the match flag to be false and store the history information thereof in the history database as in operation S2360.

In operation S2380, the object recognition rate improvement apparatus may perform processing after the track is registered, on the basis of the results determined in operations S2350 to S2370. In operation S2380, the object recognition rate improvement apparatus may perform data processing with reference to information stored in the history database and in detail, may use information regarding true or false of the match flag of the outline for each object, which is stored in the history database. In addition, the object recognition rate improvement apparatus may perform processing after the track is registered, by referring to information regarding a first reference value and a second reference value that are set values for a first parameter and a second parameter. Operation S2380 is described below with reference to FIG. 24.

Figure 24:
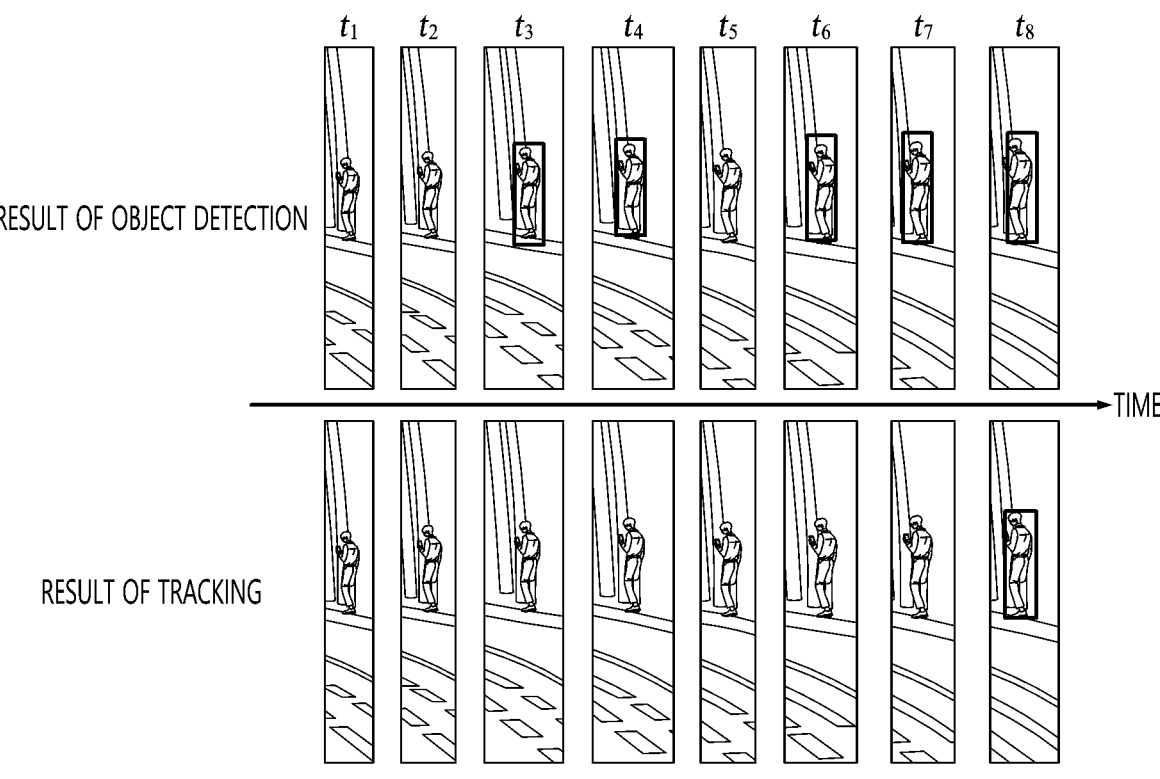
FIG. 24 is a view illustrating a processing process after registering a track, which is described in operation S2380 of FIG. 23.

FIG. 24 is a view illustrating a processing process after registering a track, which is described in operation S2380 of FIG. 23.

Referring to the upper portion of FIG. 24, an object recognition rate improvement apparatus may recognize an object by applying an object recognition algorithm to eight frames arranged in time series and thus recognize an object in a total of five frames. Frames in which an object is recognized may be frames at $t_3$, $t_4$, $t_6$, $t_7$, and $t_8$, and the object is present in the remaining three frames (i.e., frames at $t_1$, $t_2$, and $t_5$), but due to issues such as lighting, angle, distance, and color, the object may not be recognized by an object recognition algorithm of the object recognition rate improvement apparatus or the object may not be recognized due to a malfunction of the object recognition algorithm. In other words, the upper portion of FIG. 24 shows the result of operation S2320 in FIG. 23, and outlines in the form of 2D bounding boxes may be generated for the object in the frames in which the object is recognized.

Referring to the lower portion of FIG. 24, the object may be recognized in the frame at $t_8$ as a result of the object recognition rate improvement apparatus performing a tracking algorithm. A first reference value set in the object recognition rate improvement apparatus may be 3, the first reference value may be satisfied when the object is continuously detected in the frames at $t_6$, $t_7$, and $t_8$, and thus, a track for the corresponding object may be registered in the frame at $t_8$. According to the tracking algorithm described with reference to FIGS. 10 and 16, the track for the object may be registered in the frame at $t_8$, and thus, even when an object disappears in a frame at $t_9$ that is not shown in FIG. 24, tracking for the corresponding object may be continuously maintained during frames of the number according to the second reference value.

Meanwhile, the first reference value may be set to 3 in the object recognition rate improvement apparatus of FIG. 24, and thus, in FIG. 24, the track for the corresponding object may be registered in the frame at $t_8$ and the start of the track may be the frame at $t_6$. However, the object recognition rate improvement apparatus according to the present disclosure may include a process for minimizing issues occurring when a first parameter and a second parameter are changed to different values and thus may identify whether or not an unrecognized object is present event in a frame at a point in time before the track is registered by using a match flag (true or false) stored in a history database.

Referring to FIG. 24, the object recognition rate improvement apparatus according to the present disclosure may refer to information stored in the history database to identify an object recognition result and a tracking result in a frame before the frame at $t_6$ and identify that the object is recognized in the frame at $t_4$ and the frame at to but the object is not temporarily recognized in the frame at $t_5$.

The first reference value of the object recognition rate improvement apparatus may be 3, and thus, in principle, the track may not be registered even when the object is recognized twice in succession in the frames at $t_3$ and $t_4$. However, the object recognition rate improvement apparatus according to the present disclosure may operate to identify history information in a previous frame after the track is registered, and when an object, which fails to be recognized due to the first reference value increasing to 3, is present, include the corresponding object in a recognition result. In other words, in FIG. 24, the object recognition rate improvement apparatus may include all objects in the frames at $t_3$, $t_4$, $t_6$, and $t_7$ in the tracking result to determine that the object is recognized through the tracking algorithm and may process history information corresponding to a matching result (match flag that is false) of an outline in the frame at $t_6$ to be stored in the history database. The above process may be processed in operation S2380 described above.

Figure 25:
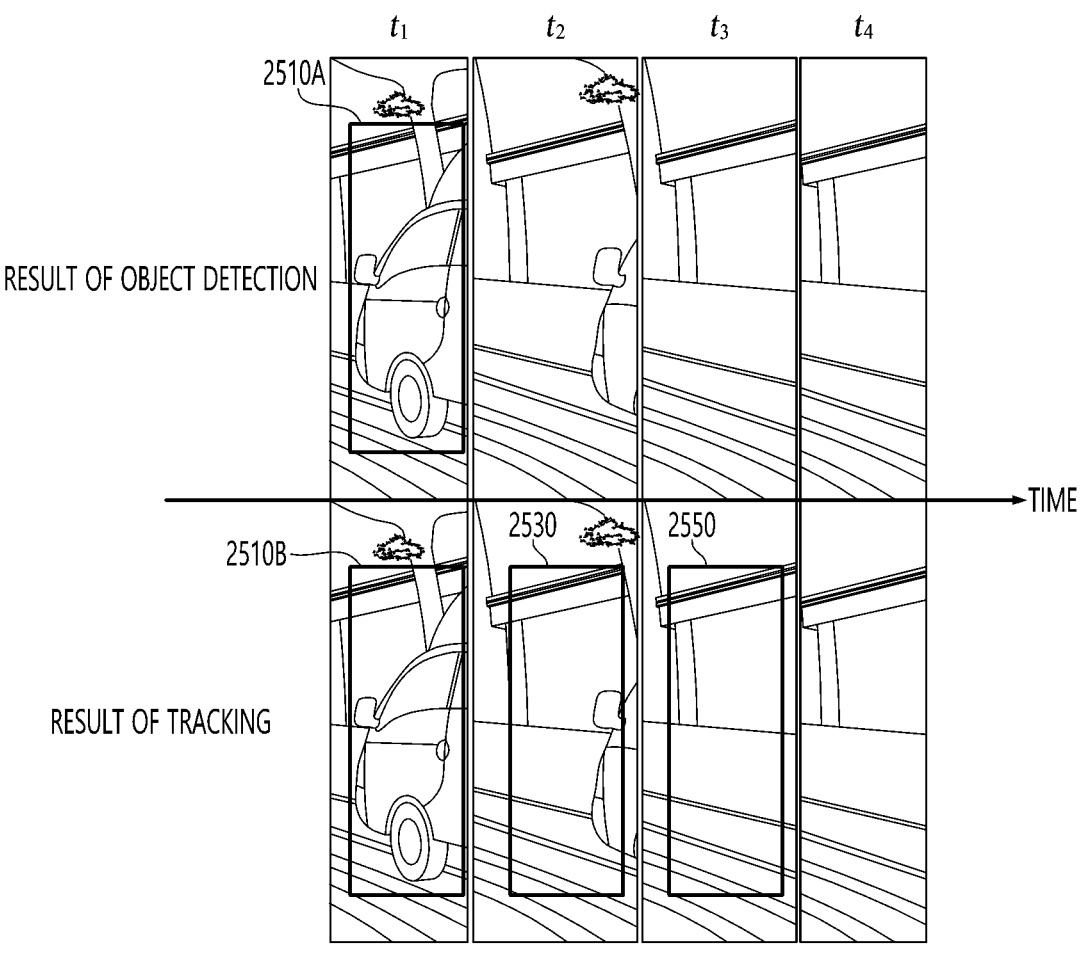
FIG. 25 is a view illustrating a processing process after deleting track, which is described in operation S2360 of FIG. 23.

FIG. 25 is a view illustrating a processing process after deleting a track, which is described in operation S2360 of FIG. 23.

Referring to the upper portion of FIG. 25, an object recognition rate improvement apparatus may recognize an object by applying an object recognition algorithm to four frames listed in time series and recognize an object in a total of one frame. A frame in which an object is recognized may be a frame at $t_1$, and an object may not be recognized in remaining three frames (i.e., frames at $t_2$, $t_3$, and $t_4$). At the upper portion of FIG. 25, a first outline 2510A in the form of a 2D bounding box may be generated for the object recognized by the object recognition algorithm.

Referring to the lower portion of FIG. 25, objects may be consecutively detected in frames at $t_1$, $t_2$, and $t_3$ as a result of the object recognition rate improvement apparatus performing a tracking algorithm. A track for the object may be preregistered, and at $t_1$, an object recognition result and a tracking result may refer to the same outline and thus a match flag may be true. Therefore, even when the object disappears in the frame at $t_2$, tracking for corresponding objects may be continuously maintained during frames of the number according to a second reference value, and outlines 2530 and 2550 corresponding to the objects may also be detected as at the lower portion of FIG. 25.

In the object recognition rate improvement apparatus of FIG. 25, the second reference value may be set to 2, and thus, outlines for objects may be still detected in the frame at $t_2$ and the frame at $t_3$ in FIG. 25, but the object recognition rate improvement apparatus according to the present disclosure may include a process for minimizing an issue occurring when a first parameter and a second parameter are changed to different values and exclude the frame at $t_2$ and the frame at $t_3$ from the entire track by using the match flag (false) stored in a history database. The results of the object recognition rate improvement apparatus according to the present disclosure may also be stored as history information in the history database described above.

FIG. 26 is a flowchart illustrating an example of an object recognition rate improvement method according to the present disclosure.

The method according to FIG. 26 may be implemented by the object recognition rate improvement apparatus described with reference to FIGS. 10, 16, 23, 24, and 25, is described below with reference to FIGS. 10, 16, 23, 24, and 25, and the same description as the above descriptions is omitted.

In operation S2610, the object recognition rate improvement apparatus may recognize an object included in an image by using a first recognition algorithm that recognizes an object in each frame of an image. In operation S2610, the first recognition algorithm may refer to an object recognition algorithm by an object recognition apparatus (an object detector) and may correspond to operation S2320 of FIG. 23.

In operation S2630, the object recognition rate improvement apparatus may form a track with a plurality of frames included in the image and recognize the object by using a second recognition algorithm that recognizes the object included in the track. In operation S2630, the second recognition algorithm may refer to a tracking algorithm by the object recognition rate improvement apparatus and may correspond to operation S2330 of FIG. 23.

As a selective embodiment, the second recognition algorithm may be an algorithm that selectively recognizes an object that is recognized in consecutive frames above a first reference value, disappears during frames below a second reference value, and then reappears. The present selective embodiment is described above together with the description of the first parameter and the second parameter.

In operation S2650, the object recognition rate improvement apparatus may compare the result of recognizing the object through the first recognition algorithm with the result of recognizing the object through the second recognition algorithm. Operation S2650 may comprehensively represent a comparison process (matching) by the object recognition rate improvement apparatus and may correspond to operations S2340 and S2350 of FIG. 23.

As an embodiment, the object recognition rate improvement apparatus may receive inputs for the first reference value and the second reference value, and when at least one of a preset first reference value and second reference value is changed by the received first reference value or second reference value, may update the result of comparison by referring to history information regarding frames before and after a preregistered track. For example, when the first reference value is changed, the object recognition rate improvement apparatus may update the result of comparison by referring to history information regarding a frame immediately before the track is generated, and the description thereof is as described above with reference to FIG. 24. In addition, when the second reference value is changed, the object recognition rate improvement apparatus may update the result of comparison by referring to history information regarding a frame after the track is generated and then deleted, and the description thereof is as described above with reference to FIG. 25.

In operation S2670, the object recognition rate improvement apparatus may correct, on the basis of the result of comparison, the result of recognizing the object in the image by using the first recognition algorithm and the second recognition algorithm. Operation S2670 may comprehensively represent a subsequent processing process by the object recognition rate improvement apparatus and may correspond to operations S2360, S2370, and S2380 of FIG. 23.

Figure 27:
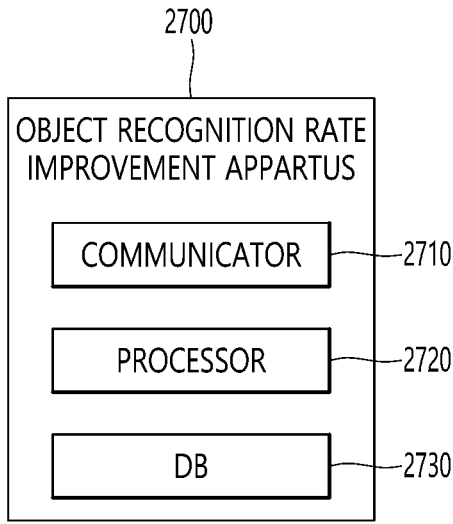
FIG. 27 is a block diagram of an object recognition rate improvement apparatus according to an embodiment.

FIG. 27 is a block diagram of an object recognition rate improvement apparatus according to an embodiment.

Referring to FIG. 27, an object recognition rate improvement apparatus 2700 may include a communicator 2710, a processor 2720, and a DB 2730. FIG. 27 illustrates that the object recognition rate improvement apparatus 2700 includes only components related to the embodiment. Accordingly, one of ordinary skill in the art may understand that other general-purpose components may be included in addition to the components shown in FIG. 27.

The communicator 2710 may include one or more components that enable wired/wireless communication with an external server or external apparatus. For example, the communicator 2710 may include at least one of a short-range communication unit (not shown), a mobile communication unit (not shown), and a broadcast receiver (not shown).

The DB 2730 may be hardware that stores various types of data processed within the object recognition rate improvement apparatus 2700 and may store a program for processing and control by the processor 2720.

The DB 2730 may include random access memory (RAM) such as dynamic random access memory (DRAM) or static random access memory (SRAM), read-only memory (ROM), electrically erasable programmable read-only memory (EEPROM), CD-ROM, Blu-ray or other optical disk storages, a hard disk drive (HDD), a solid state drive (SSD), or flash memory.

The processor 2720 may control an overall operation of the object recognition rate improvement apparatus 2700. For example, the processor 2720 may generally control an input unit (not shown), a display (not shown), the communicator 2710, the DB 2730, and the like by executing programs stored in the DB 2730. The processor 2720 can control the operation of the object recognition rate improvement apparatus 2700 by executing programs stored in the DB 2730.

The processor 2720 may control at least some of the operations of the object recognition rate improvement apparatus 2700 described above.

As an example, as described with reference to FIGS. 23 to 26, the processor 2720 may recognize an object included in an image by using a first recognition algorithm that recognizes an object in each frame of an image, form a track with a plurality of frames included in the image, recognize the object by using a second recognition algorithm that recognizes an object included in a track, compare the result of recognizing the object by using the first recognition algorithm with the result of recognizing the object by using the second recognition algorithm, and correct, on the basis of the result of comparison, the result of recognizing the object in the image by using the first recognition algorithm and the second recognition algorithm.

The processor 2720 may be implemented by using at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and other electrical units for performing functions.

According to the present disclosure, training data for improving an object recognition rate of an autonomous vehicle may be acquired by acquiring a video through a camera mounted on the autonomous vehicle during driving.

The embodiments according to the present disclosure described above may be implemented in the form of a computer program that may be executed through various components on a computer, and the computer program may be recorded on a computer-readable medium. Here, the medium may include magnetic media such as a hard disk, a floppy disk, and a magnetic tape, optical recording media such as CD-ROM and DVD, magneto-optical media such as a floptical disk, and hardware devices, such as ROM, RAM, and flash memory devices specially configured to store and execute program instructions.

Meanwhile, the computer program may be specially designed and configured for the present disclosure, or may be known to and used by those skilled in the art of the computer software field. Examples of the computer program may include not only machine language code generated by a compiler but also high-level language code that may be executed by a computer by using an interpreter or the like.

The particular implementations described in the present disclosure are embodiments and do not limit the scope of the present disclosure in any way. For brevity of the description, descriptions of existing electronic components, control systems, software, and other functional aspects of the systems may be omitted. In addition, connections or connection members of lines between components shown in the drawings are only examples of functional connections and/or physical or circuit connections, and in an actual apparatus, connections between components may be represented by various functional connections, physical connections, or circuit connections that may be replaced or added. In addition, when there is no particular mention, such as "essentially" or "importantly", it may not be an essential component for the application of the present disclosure.

In the description of the present disclosure (particularly, in claims), the use of the term "the" and similar indicative terms may correspond to both the singular and the plural forms. In addition, when a range is described in the present disclosure, the present disclosure includes the application of individual values within the range (unless there is a statement to the contrary), and each individual value constituting the range is described in the detailed description of the present disclosure. The operations constituting the method according to the present disclosure may be performed in any appropriate order unless an order of the operations is explicitly stated or stated to the contrary. The present disclosure is not necessarily limited according to the order of description of the operations. The use of all examples or example terms (e.g., and the like) in the present disclosure is simply to describe the present disclosure in detail, and the scope of the present disclosure is limited due to the examples or example terms unless limited by claims. In addition, those skilled in the art may appreciate that various modifications, combinations and changes may be made according to design conditions and factors within the scope of the appended claims or equivalents thereof.

The invention claimed is:

1. A method of generating an improved training data video, the method comprising:
    recognizing an object included in a first image by applying at least two recognition techniques to the first image acquired during driving;
    applying at least two detection techniques to a result of recognizing the object and detecting a frame by each of the applied detection techniques;
    generating a frame set including a plurality of frames by integrating the detected frames; and
    generating a second image by sampling the integrated frame set.

2. The method of claim 1, wherein the generating of the second image comprises:
    generating, on the basis of the integrated frame set, a frame group including at least one frame and including frames that do not overlap each other; and
    generating the second image by extracting a frame in each frame group.

3. The method of claim 2, wherein the generating of the second image comprises generating the second image by extracting one frame in each frame group.

4. The method of claim 2, wherein the generating of the second image comprises generating the second image by extracting, in each frame group, a number of frames corresponding to a weight set for each frame group.

5. The method of claim 4, wherein the weight set for each frame group is a value determined on the basis of a number of frames included in each frame group.

6. The method of claim 1, wherein the generating of the second image comprises extracting a plurality of frames by sampling, on the basis of a preset time interval, frames included in the integrated frame set, and generating the second image with the extracted frames.

7. The method of claim 1, wherein
    the generating of the detected frame set comprises identifying a frame repeatedly detected from among frames detected by the respective detection techniques, and
    the generating of the second image comprises generating the second image by essentially including the repeatedly detected frame therein.

8. The method of claim 1, wherein
    the recognizing of the object included in the first image comprises recognizing the object included in the first image by applying a first recognition technique and a second recognition technique,
    the first recognition technique is an algorithm recognizing the object in the first image on the basis of YoloV4-CSP, and
    the second recognition technique is an algorithm recognizing the object in the first image on the basis of YoloV4-P7.

9. The method of claim 1, wherein the at least two recognition techniques comprise a first recognition technique and a second recognition technique, and
    the at least two detection techniques comprise a detection technique detecting a frame on the basis of a result of comparing frames of objects respectively recognized by the first recognition technique and the second recognition technique.

10. The method of claim 1, wherein the at least two detection techniques comprise a detection technique detecting a frame on the basis of a result of detecting that the object recognized in the first image disappears for a certain period and then reappears.

11. A computer-readable recording medium storing a program for executing the method of claim 1.

12. An apparatus for generating an improved training data video, the apparatus comprising:
    a memory storing at least one program; and
    a processor configured to perform a calculation by executing the at least one program, wherein
    the processor is further configured to:
        recognize an object included in a first image by applying at least two recognition techniques to the first image acquired during driving;
        apply at least two detection techniques to a result of recognizing the object and detect a frame by each of the applied detection techniques;

generate a frame set including a plurality of frames by integrating the detected frames; and generate a second image by sampling the integrated frame set.

\* \* \* \* \*